United States Patent
Hirayama

(10) Patent No.: US 9,688,339 B2
(45) Date of Patent: Jun. 27, 2017

(54) VEHICLE PROVIDED WITH LEANING-CAPABLE VEHICLE-BODY FRAME AND TWO FRONT WHEELS

(71) Applicant: YAMAHA HATSUDOKI KABUSHIKI KAISHA, Iwata-shi, Shizuoka (JP)

(72) Inventor: Yosuke Hirayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/901,385

(22) PCT Filed: Jun. 30, 2014

(86) PCT No.: PCT/JP2014/067479
§ 371 (c)(1),
(2) Date: Dec. 28, 2015

(87) PCT Pub. No.: WO2015/002166
PCT Pub. Date: Jan. 8, 2015

(65) Prior Publication Data
US 2016/0137253 A1    May 19, 2016

(30) Foreign Application Priority Data
Jul. 1, 2013    (JP) ................. 2013-138482

(51) Int. Cl.
*B62K 5/10*    (2013.01)
*B62K 5/05*    (2013.01)
(Continued)

(52) U.S. Cl.
CPC ............... *B62K 5/10* (2013.01); *B60T 7/102* (2013.01); *B60T 11/16* (2013.01); *B60T 17/046* (2013.01);
(Continued)

(58) Field of Classification Search
CPC ......... B60T 11/046; B60T 7/102; B62K 5/10; B62K 5/027; B62K 19/38; B62K 5/08; B62K 5/05; B62L 3/08
(Continued)

(56) References Cited

U.S. PATENT DOCUMENTS 6,953,203 B2 *   10/2005   Wilcox ................. B62K 3/005
                                                        280/282
D547,242 S  *    7/2007   Lambri ....................... D12/110
(Continued)

FOREIGN PATENT DOCUMENTS

EP    1 561 612 A1    8/2005
EP    2 368 729 A1    9/2011
(Continued)

OTHER PUBLICATIONS

Japan Patent Office Printout showing continuity between JP 62-090264 U and JP 4-003899 Y2.*
(Continued)

*Primary Examiner* — James A English
(74) *Attorney, Agent, or Firm* — Keating and Bennett, LLP

(57) ABSTRACT

A vehicle includes a restrictor that prevents movement of a brake controlling operation transmission member and is provided at an upper portion of at least one of an upper cross portion, a right side portion, and a left side portion. The brake controlling operation transmission member includes a leaning-associated deforming portion that is located between a brake controller and the restrictor to deform in response to the leaning of a body frame and a wheel-turning-associated deforming portion at least a portion of which is located between the leaning-associated deforming portion and a brake device to deform in response to the turning of a right front wheel and a left front wheel.

5 Claims, 15 Drawing Sheets

(51) Int. Cl.

| | | |
|---|---|---|
| *B62K 5/08* | (2006.01) | |
| *B62K 19/38* | (2006.01) | |
| *B62K 5/027* | (2013.01) | |
| *B62K 21/12* | (2006.01) | |
| *B62K 25/00* | (2006.01) | |
| *B62L 3/02* | (2006.01) | |
| *B62L 3/08* | (2006.01) | |
| *B60T 17/04* | (2006.01) | |
| *B62J 17/02* | (2006.01) | |
| *B60T 7/10* | (2006.01) | |
| *B60T 11/16* | (2006.01) | |

(52) U.S. Cl.
CPC .............. *B62J 17/02* (2013.01); *B62K 5/027* (2013.01); *B62K 5/05* (2013.01); *B62K 5/08* (2013.01); *B62K 19/38* (2013.01); *B62K 21/12* (2013.01); *B62K 25/00* (2013.01); *B62L 3/023* (2013.01); *B62L 3/08* (2013.01)

(58) Field of Classification Search
USPC ........................................................ 180/209
See application file for complete search history.

(56) References Cited

U.S. PATENT DOCUMENTS

| | | | |
|---|---|---|---|
| D598,328 S | 8/2009 | Lambri | |
| 7,708,291 B1* | 5/2010 | Henderson | B62D 9/02 |
| | | | 280/124.103 |
| 8,141,890 B2* | 3/2012 | Hughes | B60G 21/007 |
| | | | 180/210 |
| 8,261,887 B2* | 9/2012 | Tseng | B60T 11/06 |
| | | | 188/2 D |
| 8,419,027 B2* | 4/2013 | Ting | B62K 5/02 |
| | | | 280/124.103 |
| 8,894,081 B2* | 11/2014 | Teerlink | B62K 3/12 |
| | | | 280/209 |
| 8,973,696 B2* | 3/2015 | Hamauzu | B60T 8/3225 |
| | | | 180/219 |
| 8,991,542 B2* | 3/2015 | Yu | B62K 5/027 |
| | | | 180/209 |
| 9,187,049 B2* | 11/2015 | Sugimoto | B62K 19/38 |
| 9,216,790 B2* | 12/2015 | Takano | B60G 17/005 |
| 9,227,684 B2* | 1/2016 | Smith | B62K 5/003 |
| 9,278,711 B2* | 3/2016 | Takano | B62K 5/05 |
| 9,296,420 B2* | 3/2016 | Sasaki | B62J 15/00 |
| 9,340,249 B2* | 5/2016 | Takano | B62K 21/00 |
| 9,352,798 B1* | 5/2016 | Hirayama | B62K 5/05 |
| 2005/0093270 A1* | 5/2005 | Wilcox | B62K 3/005 |
| | | | 280/282 |
| 2006/0049006 A1 | 3/2006 | Hasegawa et al. | |
| 2009/0152940 A1* | 6/2009 | Mercier | B60T 8/1706 |
| | | | 303/113.2 |
| 2010/0044977 A1* | 2/2010 | Hughes | B60G 21/007 |
| | | | 280/5.509 |
| 2012/0119462 A1* | 5/2012 | Mercier | B60G 21/007 |
| | | | 280/124.103 |
| 2013/0168944 A1* | 7/2013 | Bartolozzi | B60G 3/01 |
| | | | 280/269 |
| 2014/0375015 A1* | 12/2014 | Yu | B62K 5/027 |
| | | | 280/267 |

FOREIGN PATENT DOCUMENTS

| | | |
|---|---|---|
| FR | 2 881 395 A1 | 8/2006 |
| FR | 2 926 776 A1 | 7/2009 |
| JP | 62-90264 U | 6/1987 |
| JP | 62-149589 A | 7/1987 |
| JP | 4003899 Y2 * | 2/1992 |
| JP | 2006-69437 A | 3/2006 |
| JP | 2006-281853 A | 10/2006 |
| JP | 2011-42223 A | 3/2011 |
| JP | 2011-195099 A | 10/2011 |
| KR | 10-0889463 B1 | 3/2009 |
| WO | 2012/007819 A1 | 1/2012 |

OTHER PUBLICATIONS

Feb. 5, 1992, JPO, JP 4-003899 Y2, Machine Translation of Description.*
Official Communication issued in corresponding International Application PCT/JP2014/067479, mailed on Sep. 9, 2014.
Official Communication issued in corresponding European Patent Application No. 14819895.5, mailed on Jun. 10, 2016.
Official Communication issued in corresponding European Patent Application No. 14819895.5, mailed on Jun. 21, 2016.

* cited by examiner

VEHICLE PROVIDED WITH LEANING-CAPABLE VEHICLE-BODY FRAME AND TWO FRONT WHEELS

BACKGROUND OF THE INVENTION

1. Field of the Invention

The present invention relates to a vehicle including a body frame that leans and two front wheels.

2. Description of the Related Art

As a vehicle including a body frame that leans and two front wheels, for example, U.S. Design Pat. No. 547,242 and Catalogo parti di ricambio, MP3 300 ie LT Mod. ZAPM64102, Piaggio disclose a vehicle which includes two front wheels and one rear wheel.

In general, the vehicle including the body frame that leans and the two front wheels is a vehicle that turns with the body frame leaning from a vertical direction. More specifically, the body frame leans to the right of the vehicle when the vehicle turns right, whereas when the vehicle turns left, the body frame leans to the left of the vehicle. The vehicle including the body frame that leans and the two front wheels is configured so that a distance between the two wheels that are aligned in a left-and-right direction of the body frame is shorter than that of a general four-wheeled vehicle so as to ensure that the body frame leans as required. The vehicle including the two front wheels and the body frame that leans is a vehicle which is compact in size in relation to the left-and-right direction.

In the vehicle including the body frame that leans and the two front wheels, a brake master cylinder is provided on a handlebar, and brake calipers are provided at lower portions of suspension devices. The master cylinder and the brake calipers are connected by a brake hose. The brake hose includes a leaning associated deforming portion which deforms in association with the leaning of the body frame and a wheel turning associated deforming portion which deforms in association with the turning of the two front wheels.

In the vehicles described in U.S. Design Pat. No. 547,242 and Catalogo parti di ricambio, MP3 300 ie LT Mod. ZAPM64102, Piaggio which include the body frame that leans and the two front wheels, both the leaning associated deforming portion and the wheel turning associated deforming portion are provided directly above a link mechanism. The interference of the brake hose with the link mechanism is prevented by collecting the deforming portions of the brake hose at a location directly above the link mechanism. This prevents interference of an upper cross portion and a lower cross portion which move largely up and down when they are activated with the brake hose.

In the vehicles described in U.S. Design Pat. No. 547,242 and Catalogo parti di ricambio, MP3 300 ie LT Mod. ZAPM64102, Piaggio which include the body frame that leans and the two front wheels, however, since the deforming portions of the brake hose are collected at a location directly above an upper surface of the link mechanism, a large space is necessary directly above the upper surface of the link mechanism so as to allow the brake hose to deflect. Then, it is necessary to secure a large space between the location directly above the upper surface of the link mechanism and an upper surface of a cover. This increases the space between the link mechanism and the cover, eventually increasing the size of the cover and, as a result, the size of a front portion of the vehicle.

SUMMARY OF THE INVENTION

Preferred embodiments of the present invention provide a vehicle including a body frame that leans and two front wheels which prevents the enlargement in size of a front portion of the vehicle by devising the layout of a braking operation transmission member such as a brake hose. According to a preferred embodiment of the present invention, a vehicle includes a body frame that leans to the right of the vehicle when the vehicle turns right and that leans to the left of the vehicle when the vehicle turns left; a right front wheel and a left front wheel that are aligned in a left-and-right direction of the body frame; a right suspension device that supports the right front wheel at a lower portion thereof to absorb an upward displacement of the right front wheel in an up-and-down direction of the body frame; a left suspension device that supports the left front wheel at a lower portion thereof to absorb an upward displacement of the left front wheel in the up-and-down direction of the body frame; a link mechanism including a right side portion that supports an upper portion of the right suspension device so as to allow the upper portion to turn about a right steering axis that extends in the up-and-down direction of the body frame, a left side portion that supports an upper portion of the left suspension device so as to allow the upper portion to turn about a left steering axis that is parallel to the right steering axis, an upper cross portion that supports, at a right end portion thereof, an upper portion of the right side portion so as to allow the upper portion to turn about an upper right axis that extends in a front-and-rear direction of the body frame and supports, at a left end portion thereof, an upper portion of the left side portion so as to allow the upper portion to turn about an upper left axis that is parallel to the upper right axis, and that is supported on the body frame at a middle portion thereof so as to turn about an upper middle axis that is parallel to the upper right axis and the upper left axis, and a lower cross portion that supports at a right end portion thereof a lower portion of the right side portion so as to allow the lower portion to turn about a lower right axis that is parallel to the upper right axis and supports at a left end portion thereof a lower portion of the left side portion so as to allow the lower portion to turn about a lower left axis that is parallel to the upper left axis and that is supported on the body frame at a middle portion so as to turn about a lower middle axis that is parallel to the upper middle axis and the lower middle axis; a body cover that covers at least a portion of the link mechanism; a steering shaft that is supported on the body frame between the right suspension device and the left suspension device in the left-and-right direction of the body frame that turns about a middle steering axis that extends in the up-and-down direction of the body frame; a handlebar that is provided at an upper end portion of the steering shaft; a wheel turning operation transmission mechanism that turns the right suspension device about the right steering axis and the left suspension device about the left steering axis as the steering shaft turns in response to the operation of the handlebar; a brake device that is provided below the link mechanism to apply a braking force to at least one of the right front wheel and the left front wheel; a brake controller that is provided above the link mechanism to control the brake device; and a brake controlling operation transmission member that connects the brake controller and the brake device together so as to transmit a brake controlling operation that is inputted into the brake controller to the brake device; wherein a restrictor that prevents a movement of the brake controlling operation transmission member is provided at an upper portion of at least one of the upper cross portion, the right side portion, and the left side portion; the brake controlling operation transmission member includes a leaning associated deforming portion that is located between the brake controller and the restrictor to deform in response to the leaning of the body frame and a wheel turning associated deforming portion that is located between the leaning associated deforming portion and the brake device to deform in response to the turning of the right front wheel and the left front wheel.

The right front wheel and the left front wheel are provided at a lower portion of a front portion of the vehicle. A space is provided between a right member (the right front wheel, a right shock absorbing device, and a right brake device) that turns relative to the body frame and the body frame and a body portion that is fixed to the body frame to prevent interference therebetween when the right front wheel is turned. A space is provided between a left member (the left front wheel, a left shock absorbing device, and a left brake device) that turns relative to the body frame and the body frame and a body portion to prevent interference therebetween when the left front wheel is turned.

When an additional member is attempted to be disposed in the space that prevents interference between the right member and the body frame and the body portion and in the space that prevents interference between the left member and the body frame and the body portion, a careful design is necessary to prevent the interference of the additional member with the other members, and hence, no additional member is desired to be disposed in these spaces. Because of this, in general, the deforming portions of the brake controlling operation transmission member such as the brake hose are desired not to be disposed in those spaces.

In the vehicles of U.S. Design Pat. No. 547,242 and Catalogo parti di ricambio, MP3 300 ie LT Mod. ZAPM64102, Piaggio, the deforming portions of the brake hose are collected at a location directly above the upper cross portion. Because of this, the brake hose is laid out compactly.

In the vehicles of U.S. Design Pat. No. 547,242 and Catalogo parti di ricambio, MP3 300 ie LT Mod. ZAPM64102, Piaggio, however, although the brake hose itself is laid out compactly, the front portion of the vehicle is enlarged.

Then, the inventor of the present invention studied in detail the movement of the brake controlling operation transmission member and the operation of the link mechanism with a view to finding out another method of preventing the interference of the brake controlling operation transmission member such as the brake hose with the link mechanism.

The leaning associated deforming portion is located at a portion of the brake controlling operation transmission member that is located between positions that are fixed to two points (for example, one point on the body frame and one point on the right side portion) that are displaced largely relative to each other in association with the operation of the link mechanism. In case the portion of the brake controlling operation transmission member that deforms when the relative positions of these two points change largely in the up-and-down direction is the leaning associated deforming portion, since the link mechanism changes its shape or posture about the axes that extend in the front-and-rear direction, although the leaning associated deforming portion is deformed largely in the up-and-down direction, the leaning associated deforming portion does not have to deform largely in directions other than the up-and-down direction (for example, in the front-and-rear direction or the left-and-right direction). For example, in the event that the brake controlling operation transmission member is deformed along a plane that is perpendicular or substantially perpendicular to the front-and-rear direction or a plane that is perpendicular or substantially perpendicular to the left-and-right direction when the distance between the two points is reduced in the up-to-direction to allow the two points to approach each other, the change in posture of the leaning associated deforming portion is small in the front-and-rear direction or the left-and-right direction.

The wheel turning associated deforming portion is located between portions of the brake controlling operation transmission member which are fixed to two points (for example, one point on the upper cross portion and one point on the right front wheel) which are displaced relatively and largely in association with the turning of the right front wheel and the left front wheel. The right front wheel turns about the right steering axis, and the left front wheel turns about the left steering axis, and therefore, in case the portion of the brake controlling operation transmission member that deforms when the relative positions of the two points in the front-and-rear direction or the left-and-right direction change largely is defined as the wheel turning associated deforming portion, although the wheel turning associated deforming portion has to change its shape or posture largely in the front-and-rear direction or the left-and-right direction, the wheel turning associated deforming portion does not have to change its posture in the up-and-down direction. For example, in the event that the brake controlling operation transmission member is caused to deform along a plane that is perpendicular or substantially perpendicular to the up-and-down direction when the distance between the two points in the left-and-right direction or the front-and-rear direction is narrowed, the change in posture of the wheel turning associated deforming portion is small in the up-and-down direction.

In particular, the inventor discovered that by separating the leaning associated deforming portion from the wheel turning associated deforming portion, the leaning associated deforming portion deforms a small amount in the other directions than the up-and-down direction, and the wheel turning associated deforming portion deforms a small amount in the up-and-down direction.

In addition, the inventors considered the relative displacement between the brake controller such as the master cylinder that is located above the link mechanism and the upper portion (the upper portion of the upper cross portion, the upper portion of the right side portion, the upper portion of the left side portion) of the link mechanism which occurs in association with the operation of the link mechanism.

The link mechanism includes the right side portion, the left side portion, the upper cross portion, and the lower cross portion.

The right side portion supports the upper portion of the right suspension device so as to turn about the right steering axis that extends in the up-and-down direction of the body frame.

The left side portion supports the upper portion of the left suspension device so as to turn about the left steering axis that is parallel to the right steering axis.

The upper cross portion supports the upper portion of the right side portion at the right end portion thereof so as to turn about the upper right axis that extends in the front-and-rear direction of the body frame, supports the upper portion of the left side portion at the left end portion thereof so as to turn about the upper left axis that is parallel to the upper right axis, and is supported on the body frame at the middle portion thereof so as to turn about the upper middle axis that is parallel to the upper right axis and the upper left axis.

The lower cross portion supports the lower portion of the right side portion at the right end portion so as to turn about the lower right axis that is parallel to the upper right axis, supports the lower portion of the left side portion at the left end portion thereof so as to turn about the lower left axis that is parallel the upper left axis, and is supported on the body frame at the middle portion thereof so as to turn about the lower middle axis that is parallel to the upper middle axis.

The upper cross portion turns relative to the body frame and the body portion about the upper middle axis that extends in the front-and-rear direction. Because of this, when the link mechanism is activated to operate, the brake controller and the upper portion of the link mechanism are displaced largely relative to each other in the up-and-down direction but are not displaced largely relative to each other in the front-and-rear direction.

In addition, arc-shaped loci along which the right end portion and the left end portion of the upper portion of the link mechanism pass when the link mechanism is activated to operate are such that a dimension in the up-and-down direction is greater than a dimension in the left-and-right direction. Because of this, when the link mechanism is activated to operate, the brake controller and the upper portion of the link mechanism are displaced largely relative to each other in the up-and-down direction but are not displaced largely relative to each other in the left-and-right direction.

The right member (the right front wheel, the right shock absorbing device, and the right brake device) turns about the right steering axis that extends in the up-and-down direction. Because of this, the right member moves largely relative to the link mechanism in the front-and-rear or left-and-right direction but does not move largely relative to the link mechanism in the up-and-down direction.

The left member (the left front wheel, the left shock absorbing device, and the left brake device) turns about the left steering axis that extends in the up-and-down direction. Because of this, the left member moves largely relative to the link mechanism in the front-and-rear or left-and-right direction but does not move largely relative to the link mechanism in the up-and-down direction.

Then, the inventors conceived of the idea that a restrictor that prevents the movement of the brake controlling operation transmission member is provided at the upper portion of at least one of the upper cross portion, the right side portion and the left side portion of the link mechanism, the leaning associated deforming portion is provided between the brake controller and the restrictor and at least the portion of the wheel turning associated deforming portion is provided between the restrictor and the brake device.

As has been described above, when the body frame leans, both the leaning associated deforming portion and the link mechanism are displaced largely in the up-and-down direction. Namely, since both the leaning associated deforming portion and the link mechanism tend to change their shapes or postures in similar directions, even in the event that they are disposed near each other, it is easy to prevent interference of the leaning associated deforming portion with the link mechanism. Additionally, since both the leaning associated deforming portion and the link mechanism are displaced largely in the up-and-down direction, it is possible to provide the leaning associated deforming portion by using the space that is provided to permit the operation of the link mechanism. In other words, even though the leaning associated deforming portion is provided, the expansion of the space that permits the operation of the link mechanism is prevented.

In the manner described above, when the front wheels are turned, both the wheel turning associated deforming portion and the right member or the left member are displaced largely in the front-and-rear direction or the left-and-right direction relative to the link mechanism but are not displaced largely in the up-and-down direction. In particular, since both the wheel turning associated deforming portion and the right member or the left member tend to change their shapes or postures in similar directions, even in the event that they are disposed near each other, it is easy to prevent interference of the wheel turning associated deforming portion with the right member or the left member. That the link mechanism and the leaning associated deforming portion tend to change their postures in similar directions means that the directions in which the link mechanism and the leaning associated deforming portion change their postures largely and the directions in which they change their postures by a small or minimal amount are similar and that the timings at which the link mechanism and the leaning associated deforming portion change their postures are similar. In addition, it is possible to provide the wheel turning associated deforming portion by using the space provided to permit the displacement of the right member or the left member. In other words, even though the wheel turning associated deforming portion is provided, the expansion of the space that permits the displacement of the right member or the left member is prevented.

Because of this, the leaning associated deforming portion and the wheel turning associated portion are located using the space that permits the displacement of the link mechanism and the space that permits the displacement of the right member or the left member, so that the vehicle is small in size while securing the space where to accommodate the brake controlling operation transmission member. This provides the vehicle including the two front wheels and the body frame that leans that prevents the enlargement in size of the front portion of the vehicle while ensuring the degree of freedom in designing the suspension devices and the front wheels.

In preferred embodiments of the present invention, the following configurations may be used. The brake device includes a right brake device that applies a braking force to the right front wheel and a left brake device that applies a braking force to the left front wheel, the restrictor includes a right restrictor that is provided at a right portion of the vehicle in relation to the left-and-right direction of the body frame and a left restrictor that is provided at a left portion of the vehicle in relation to the left-and-right direction of the body frame, and the wheel turning associated deforming portion includes a right wheel turning associated deforming portion at least a portion of which is located between the right restrictor and the right brake device and which deforms as the right front wheel is turned about the right steering axis and a left wheel-tuning-associated deforming portion at least a portion of which is located between the left restrictor and the left brake device and that deforms as the left front wheel is turned about the left steering axis.

The right front wheel is turned about the right steering axis, and the left front wheel is turned about the left steering axis. In particular, the right front wheel and the left front wheel are turned about the different axes. Because of this, the right wheel turning associated deforming portion and the left wheel turning associated deforming portion are in spaces that are separated in the left-and-right direction, so that it is easy to make both the right wheel turning associated deforming portion and the left wheel turning associated deforming portion smaller.

In preferred embodiments of the present invention, the following configurations may be used. The right wheel turning associated deforming portion extends in the up-and-down direction of the body frame to deform about the right steering axis, and the left wheel turning associated deforming portion extends in the up-and-down direction of the body frame to deform about the left steering axis.

The right member including the right wheel changes its shape or posture about the right steering axis and the right wheel turning associated deforming portion deforms about the right steering axis, and therefore, the right member and the right wheel turning associated deforming portion tend to change their shapes or postures in similar directions, and hence, even in the event that the right member and the right wheel turning associated deforming portion are disposed near each other, they are prevented from interfering with each other. Because of this, the right wheel turning associated deforming portion is provided in the space that is provided to permit the displacement of the right member, so that a further enlargement of the space that permits the displacement of the right member is prevented.

The left member including the left wheel changes its shape or posture about the left steering axis and the left wheel turning associated deforming portion deforms about the left steering axis, and therefore, the left member and the left wheel turning associated deforming portion tend to change their shapes or postures in similar directions, and hence, even in the event that the left member and the left wheel turning associated deforming portion are disposed near to each other, they are prevented from interfering with each other. Because of this, the left wheel turning associated deforming portion is provided in the space that is provided to permit the displacement of the left member, so that a further enlargement of the space that permits the displacement of the left member is prevented.

Because of this, the right wheel turning associated deforming portion and the left wheel turning associated deforming portion deform about the corresponding steering axes, so that it is easy to make both the right wheel turning associated deforming portion and the left wheel turning associated deforming portion smaller.

In preferred embodiments of the present invention, the following configurations may be used. At least a portion of the wheel turning associated deforming portion is located below the lower cross portion.

When the right front wheel and the left front wheel are turned, although the upper cross portion, the lower cross portion, the right side portion, and the left side portion are not displaced relative to the body frame, the right front wheel and the left front wheel that are located below the lower cross portion are displaced relative to the body frame.

In the event that at least a portion of the wheel turning associated deforming portion is located below the lower cross portion, when the right front wheel and the left front wheel are turned, the wheel turning associated deforming portion is prevented from interfering with the upper cross portion, the lower cross portion, the right side portion, and the left side portion. Because of this, the wheel turning associated deforming portion is provided in the spaces that are provided to permit the displacement of the right front wheel and the left front wheel, so that the enlargement of the spaces that permit the displacement of the right front wheel and the left front wheel is prevented.

In preferred embodiments of the present invention, the following configurations may be used. At least a portion of the leaning associated deforming portion is located between the front or rear of any one of the upper cross portion, the lower cross portion, the right side portion, and the left side portion and the body cover in relation to the front-and-rear direction of the body frame.

When the link mechanism is activated to operate, the upper cross portion, the lower cross portion, the right side portion, and the left side portion turn about the axes that extend individually in the front-and-rear direction. Because of this, even in the event that the link mechanism is activated to operate, the upper cross portion, the lower cross portion, the right side portion, and the left side portion are not displaced largely in the front-and-rear direction. In the event that at least a portion of the leaning associated deforming portion that deforms as the link mechanism operates is located between the front or rear of any one of the upper cross portion, the lower cross portion, the right side portion, and the left side portion and the body cover, the leaning associated deforming portion is prevented from interfering with them. Because of this, the leaning associated deforming portion is provided in the space that is provided to permit the operation of the link mechanism, so that the enlargement of the space that permits the operation of the link mechanism is prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of a vehicle according to the present invention will be described by reference to the accompanying drawings.

In this preferred embodiment, a vehicle including two front wheels and one rear wheel will be illustrated as an example of the vehicle.

Figure 1:
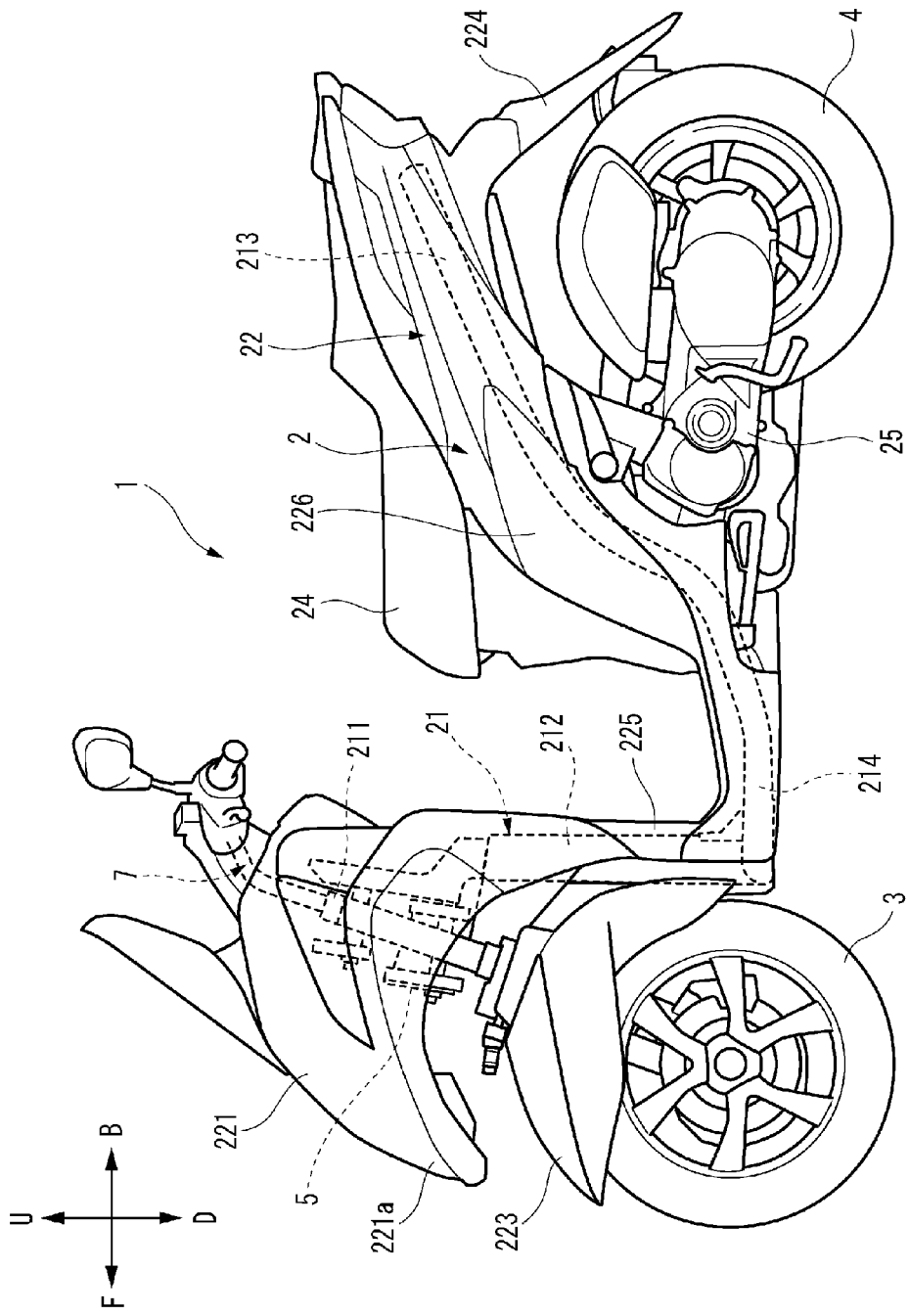
FIG. 1 is an overall side view of a vehicle according to a preferred embodiment of the present invention.

FIG. 1 is an overall side view of a vehicle seen from the left of the vehicle 1. Hereinafter, in the drawings, an arrow F denotes a forward direction of the vehicle 1 and an arrow B denotes a rearward direction of the vehicle 1. An arrow U denotes an upward direction of the vehicle 1 and an arrow D denotes a downward direction of the vehicle 1. When forward, rearward, leftward, and rightward directions are referred to in the following description, they mean forward, rearward, leftward, and rightward directions as seen from a rider of the vehicle 1. An up-and-down direction means a vertical direction and also a substantially up-and-down direction which inclines from the vertical direction. A left-and-right direction means a horizontal direction and also a substantially left-and-right direction which inclines from the horizontal direction. A center in a vehicle's width direction means a central position of the vehicle 1 in the vehicle's width direction. The right in the vehicle's width direction means a direction directed from the center in the vehicle's width direction toward the right. The left in the vehicle's width direction means a direction directed from the center in the vehicle's width direction toward the left. An unloaded state of the vehicle means a state in which the vehicle 1 is in the upright state with front wheels neither steered nor caused to lean in such a state that no rider rides on and no fuel is put in the vehicle 1.

As shown in FIG. 1, the vehicle 1 includes a vehicle main body portion 2, a pair of left and right front wheels 3 (refer to FIG. 2), a rear wheel 4, a steering mechanism 7, and a link mechanism 5. The vehicle main body portion 2 includes a body frame 21, a body cover 22, a seat 24, and a power unit 25.

The body frame 21 includes a headstock 211, a down frame 212, an under frame 214, and a rear frame 213. In FIG. 1, in the body frame 21, portions that are hidden by the body cover 22 are shown by broken lines. The body frame 21 supports the power unit 25, the seat 24 and the like. The power unit 25 includes a drive source such as an engine, an electric motor or the like, a transmission and the like.

The headstock 211 is disposed at a front portion of the vehicle 1. The headstock 211 is slanted with respect to the vertical direction so that, in a side view of the vehicle 1, an upper portion thereof is positioned behind the lower portion thereof. The steering mechanism 7 and the link mechanism 5 are disposed around the headstock 211. A steering shaft 60 of the steering mechanism 7 is inserted into the headstock 211 so as to be turned therein. The headstock 211 supports the link mechanism 5.

The headstock 211 is a portion of the body frame 21 and is allowed to lean to the right of the vehicle 1 when the vehicle 1 turns right and to lean to the left of the vehicle 1 when the vehicle 1 turns left.

The down frame 212 is connected to the headstock 211. The down frame 212 is disposed behind the headstock 211 and extends along the up-and-down direction. The under frame 214 is connected to a lower portion of the down frame 212. The under frame 214 extends rearward from the lower portion of the down frame 212. The rear frame 213 is disposed behind the under frame 214 and extends obliquely rearward and upward. The rear frame 213 supports the seat 24, the power unit 25, a tail lamp and the like.

The body frame 21 is covered by the body cover 22. The body cover 22 includes a front cover 221, a pair of left and right mudguards 223, a leg shield 225, a center cover 226, and a rear mudguard 224.

The front cover 221 is positioned ahead of the seat 24. The front cover 221 covers at least a portions of the steering mechanism 7 and the link mechanism 5. The front cover 221 includes a front portion 221a that is disposed ahead of the link mechanism 5. In a side view of the vehicle 1 in an unloaded state, the front portion 221a of the front cover 221 is provided above the front wheels 3. In the side view of the vehicle 1 in the unloaded state, the front portion 221a of the front cover 221 is disposed behind front ends of the front wheels 3. The leg shield 225 is disposed below the front cover 221 and ahead of the seat 24. The center cover 226 is disposed so as to cover the circumference of the rear frame 213.

The pair of left and right front mudguards 223 (see FIG. 2) is disposed directly below the front cover 221 and directly above the pair of front wheels 3. The rear mudguard 224 is disposed directly above a rear portion of the rear wheel 4.

The pair of left and right front wheels 3 is disposed below the headstock 211 and directly below the front cover 221 when the vehicle 1 is unloaded. The rear wheel 4 is disposed below the center cover 226 and the rear mudguard 224.

Figure 2:
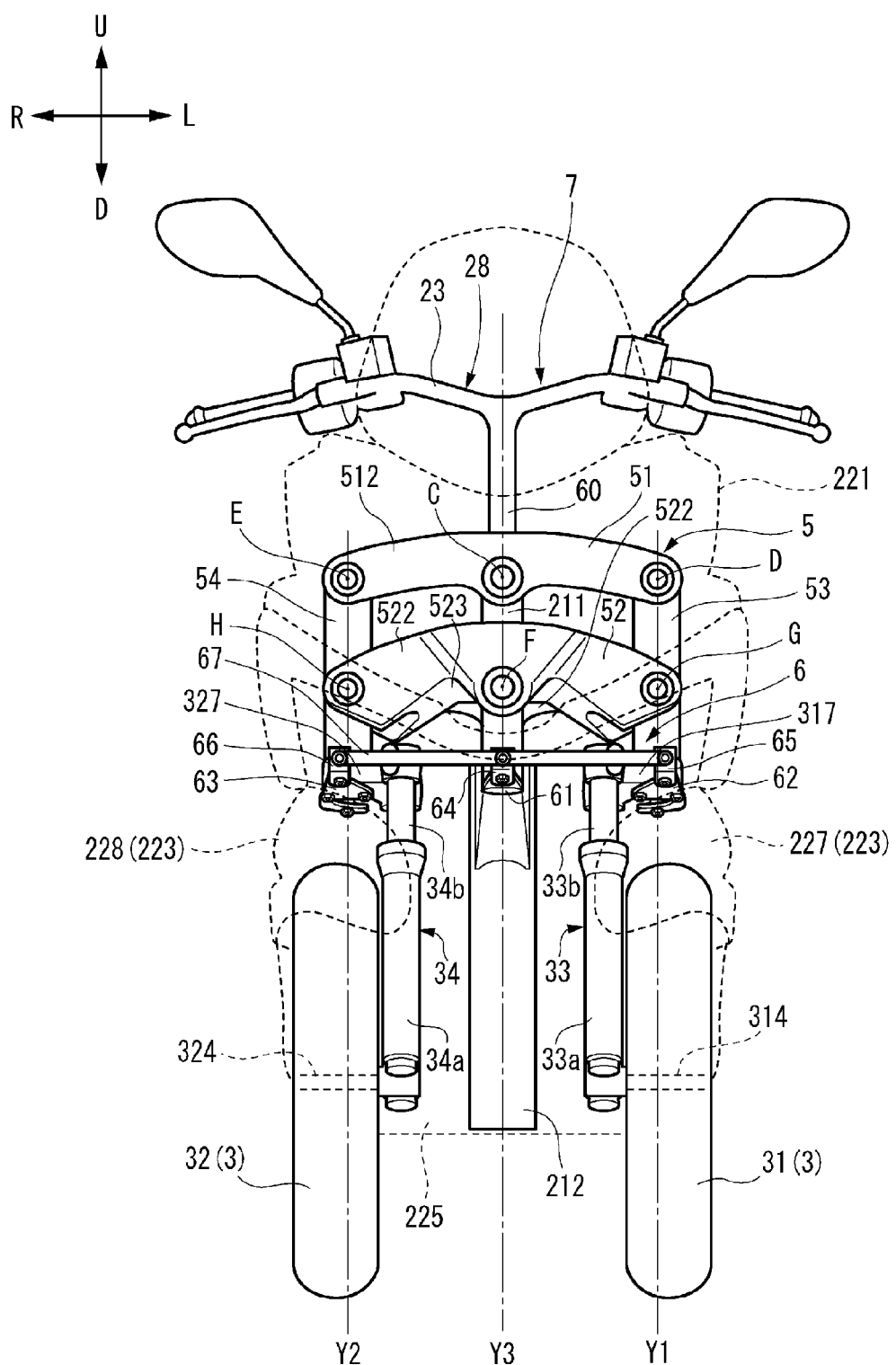
FIG. 2 is a front view of a front portion of the vehicle shown in FIG. 1.
Figure 3:
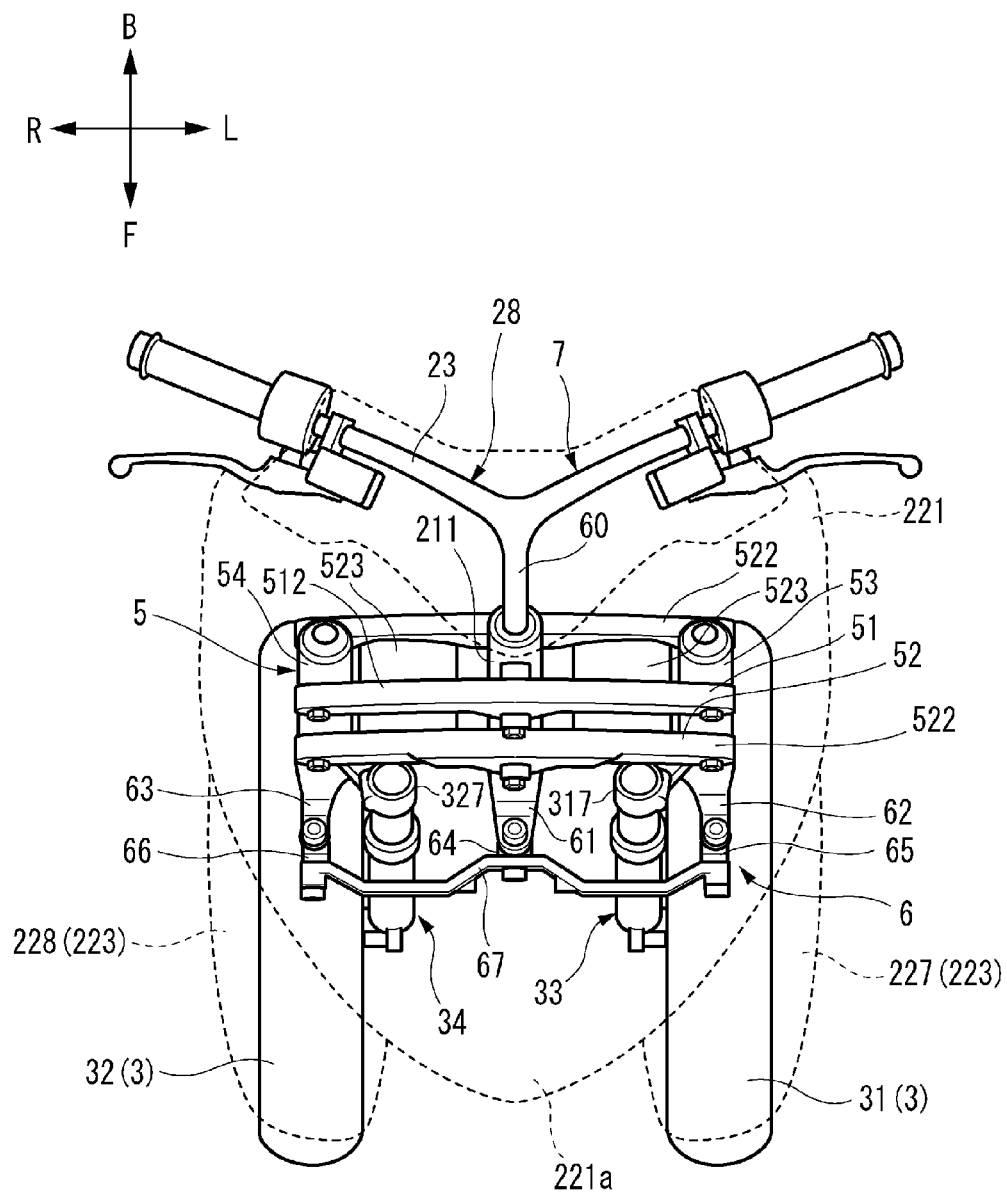
FIG. 3 is a plan view of the front portion of the vehicle shown in FIG. 1.

FIG. 2 is a front view of the front portion of the vehicle 1 shown in FIG. 1 when viewed from the front thereof. FIG. 3 is a plan view of the front portion of the vehicle 1 shown in FIG. 1 when viewed from thereabove. FIGS. 2 and 3 show the front portion of the vehicle 1 as seen through the body cover 22.

As shown in FIGS. 2 and 3, the steering mechanism 7 includes a wheel turning operation transmission mechanism 6, a left shock absorber 33, a right shock absorber 34, and a pair of left and right front wheels 3.

The pair of right and left front wheels 3 includes the left front wheel 31 and the right front wheel 32. The left front wheel 31 and the right front wheel 32 are arranged in a left-and-right direction of the body frame 21. Of the pair of left and right front mudguards 223, a first front mudguard 227 is disposed directly above the left front wheel 31. Of the pair of left and right front mudguards 223, a second front mudguard 228 is disposed directly above the right wheel 32. The left front wheel 31 is supported by the left shock absorber 33. The right front wheel 32 is supported by the right shock absorber 34.

The left shock absorber 33 (an example of a left suspension device) is preferably a so-called telescopic shock absorber and dampens vibrations from a road surface. The left shock absorber 33 supports the left front wheel 31 at a lower portion thereof and absorbs an upward displacement of the left front wheel 31 in the up-and-down direction of the body frame 21. The left shock absorber 33 includes a first lower-side portion 33a and a first upper-side portion 33b. The left front wheel 31 is supported on the first lower-side portion 33a. The first lower-side portion 33a extends in the up-and-down direction, and a left wheel axle 314 is supported on a lower end side of the first lower-side portion 33a. The left wheel axle 314 supports the left front wheel 31. The first upper-side portion 33b is disposed at an upper side of the first lower-side portion 33a in such a state that the first upper-side portion 33b is partially inserted into the first lower-side portion 33a. The first upper-side portion 33b moves relative to the first lower-side portion 33a in a direction in which the first lower-side portion 33a extends. An upper portion of the first upper-side portion 33b is fixed to a first bracket 317.

Figure 5:
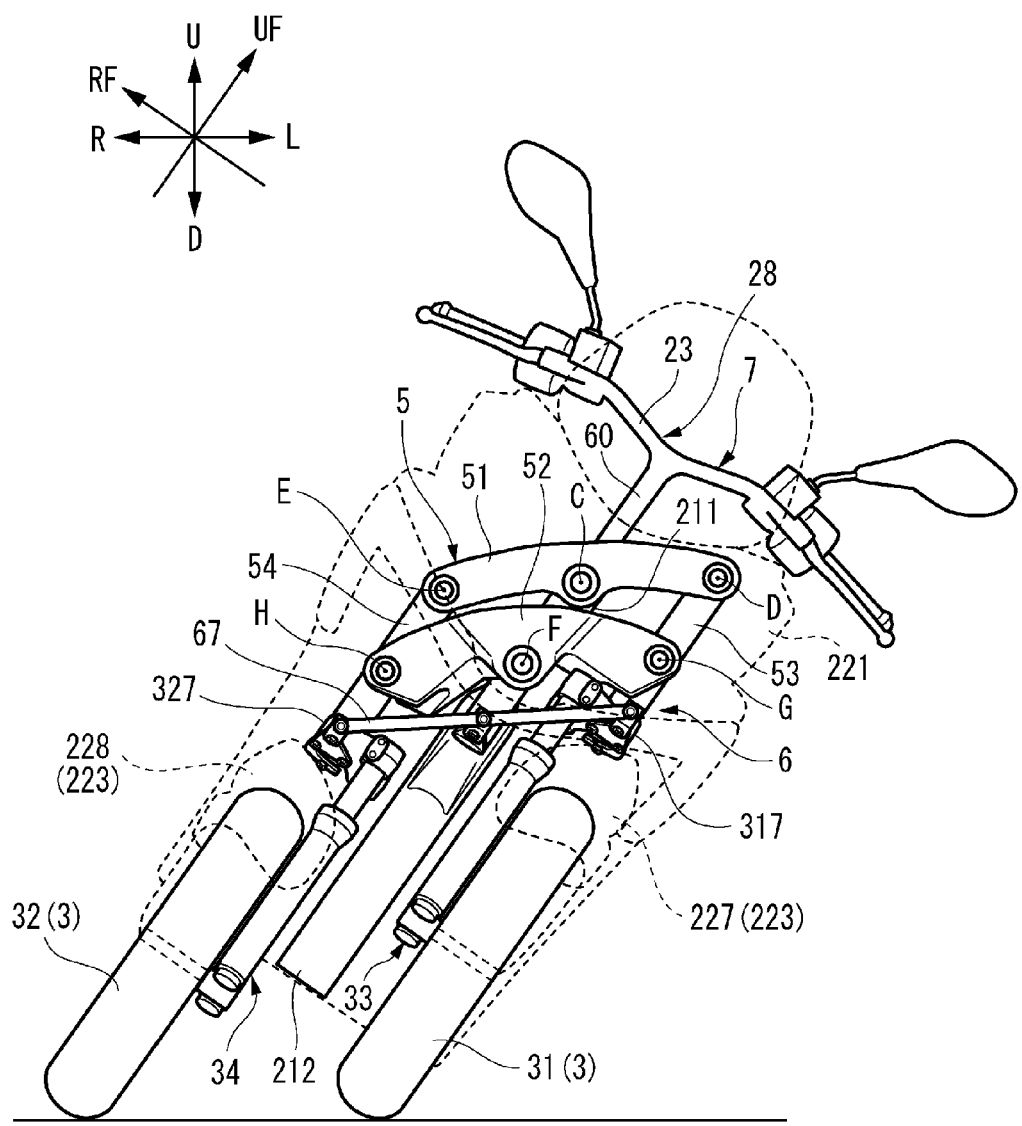
FIG. 5 is a front view of the front portion of the vehicle in a state where the vehicle shown in FIG. 1 is caused to lean.

In this description, the "left-and-right direction of the body frame 21" denotes a direction that intersects at right angles or perpendicular or substantially perpendicular to an axial direction of the headstock 211 when the vehicle 1 is viewed from the front thereof. An up-and-down direction of the body frame 21 denotes a direction which extends in an axial direction of the headstock 211 when the vehicle 1 is viewed from the front thereof. For an example, the up-and-down direction of the body frame 21 coincides with the axial direction of the headstock 211. As shown in FIG. 2, in such a state that the vehicle 1 is in an upright state, a rightward direction RF of the body frame 21 coincides with a rightward direction R in a horizontal direction when the vehicle 1 is viewed front the front thereof. Because of this, only the rightward direction R in the horizontal direction is shown in FIG. 2. As shown in FIG. 5, in such a state that the vehicle 1 leans relative to a road surface, when the vehicle 1 is viewed from the front thereof, the rightward direction RF of the body frame 21 does not coincide with the rightward direction R in the horizontal direction, and an upward direction UF of the body frame 21 does not coincide with an upward direction U in the vertical direction.

The first lower-side portion 33*a* and the first upper-side portion 33*b* define two telescopic elements that are aligned parallel in the front-and-rear direction and are connected together. This configuration prevents the first upper-side portion 33*b* from turning relative to the first lower-side portion 33*a*.

The right shock absorber 34 (an example of a right suspension device) is preferably a so-called telescopic shock absorber and dampens vibrations from a road surface. The left shock absorber 34 supports the right front wheel 32 at a lower portion thereof and absorbs an upward displacement of the right front wheel 32 in the up-and-down direction of the body frame 21. The right shock absorber 34 includes a second lower-side portion 34*a* and a second upper-side portion 34*b*. The right front wheel 32 is supported on the second lower-side portion 34*a*. The second lower-side portion 34*a* extends in the up-and-down direction, and a right wheel axle 324 is supported on a lower end side of the second lower-side portion 34*a*. The right wheel axle 324 supports the right front wheel 32. The second upper-side portion 34*b* is disposed at an upper side of the second lower-side portion 34*a* in such a state that the second upper-side portion 34*b* is partially inserted into the second lower-side portion 34*a*. The second upper-side portion 34*b* moves relative to the second lower-side portion 34*a* in a direction in which the second lower-side portion 34*a* extends. An upper portion of the second upper-side portion 34*b* is fixed to a second bracket 327.

The second lower-side portion 34*a* and the second upper-side portion 34*b* define two telescopic elements that are aligned parallel in the front-and-rear direction and are connected together. This configuration prevents the second upper-side portion 34*b* from turning relative to the second lower-side portion 34*a*.

The wheel turning operation transmission mechanism 6 is disposed above the left front wheel 31 and the right front wheel 32. The wheel turning operation transmission mechanism 6 includes a steering member 28 by which the rider inputs a steering effort or a steering force. The steering member 28 includes the steering shaft 60 and a handlebar 23 that is provided at an upper end portion of the steering shaft 60.

The steering shaft 60 is supported on the headstock 211 between the left shock absorber 33 and the right shock absorber 34 in the left-and-right direction of the body frame 21. Additionally, the steering shaft 60 turns about a middle steering axis Y3 that extends in the up-and-down direction of the body frame 21. The steering shaft 60 is disposed so that the steering shaft 60 is partially inserted into the headstock 211 and extends substantially in the up-and-down direction. The steering shaft 60 is able to be turned relative to the headstock 211. The steering shaft 60 is turned in association with the rider turning the handlebar 23.

The wheel turning operation input mechanism 6 turns the left shock absorber 33 about a left steering axis Y1 that extends in the up-and-down direction and turns the right shock absorber 34 about a right steering axis Y2 that is parallel to the left steering axis Y1 in association with the turning of the steering shaft 60 which is triggered in response to the operation of the handlebar 23.

The wheel turning operation transmission mechanism 6 includes, in addition to the steering member 28, a first transmission plate 61, a second transmission plate 62, a third transmission plate 63, a first joint 64, a second joint 65, a third joint 66, a tie-rod 67, the first bracket 317, and the second bracket 327. The wheel turning operation transmission mechanism 6 transmits a steering effort or a steering force with which the handlebar 23 is controlled to the first bracket 317 and the second bracket 327 via those constituent members.

The first transmission plate 61 is disposed at the center in the vehicle's width direction and is connected to the steering shaft 60 so as not to turn relative to the steering shaft 60. The first transmission plate 61 turns as the steering shaft 60 turns.

The second transmission plate 62 is connected to a left side portion 53 of the link mechanism 5, which will be described below, so as to turn relatively. The second transmission plate 62 is fixed to the first bracket 317. The second transfer plate 62 is disposed below the first bracket 317. The second transmission plate 62 is disposed on the left of the first transmission plate 61.

The third transmission plate 63 is connected to a right side portion 54 of the link mechanism 5, which will be described below, so as to turn relatively. The third transmission plate 63 is disposed laterally symmetrical with the second transmission plate 62 around the first transmission plate 61. The third transmission plate 63 is fixed to the second bracket 327. The third transfer plate 63 is positioned below the second bracket 327.

The first joint 64 is disposed at a front portion of the first transmission plate 61. The first joint 64 is supported by a turning shaft that extends in the up-and-down direction so as to turn relative to the first transmission plate 61. The second joint 65 is disposed at a front portion of the second transmission plate 62. The second joint 65 is supported by a turning shaft that extends in the up-and-down direction so as to turn relative to the second transmission plate 62. The third joint 66 is disposed at a front portion of the third transmission plate 63. The third joint 66 is supported by a turning shaft that extends in the up-and-down direction so as to turn relative to the third transmission plate 63. The first joint 64, the second joint 65, and the third joint 66 each include a shaft portion that extends in the front-and-rear diction at a front portion thereof.

The tie rod 67 extends in the vehicle's width direction. The tie-rod 67 is supported so as to turn relative to the shaft portions that extend in the front-and-rear direction at the front portions of the first joint 64, the second joint 65, and the third joint 66. This tie-rod 67 is a portion of the wheel turning operation transmission mechanism 6 and moves so as to maintain a parallel relationship with a lower cross portion 52, which will be described below, when the body frame 21 leans.

The wheel turning operation transmitting mechanism 6 that is configured in the manner described above transmits a steering force transmitted from the steering member 28 to the tie-rod 67 via the first transmission plate 61 and the first joint 64. This causes the tie rod 67 to be displaced either leftward or rightward. The steering effort transmitted to the tie rod 67 is transmitted from the tie rod 67 to the first bracket 317 by way of the second transmission plate 62 and the second joint 65 and is also transmitted from the tie rod 67 to the second bracket 327 by way of the third transmission plate 63 and the third joint 66. As a result, the first bracket 317 and the second bracket 327 are turned in the direction in which the tie-rod 67 is displaced.

In this preferred embodiment, the link mechanism 5 is preferably a four-joint parallel link system (also, called a parallelogram link).

The link mechanism 5 is disposed below the handlebar 23. The link mechanism 5 is connected to the headstock 211 of the body frame 21. The link mechanism 5 includes an upper cross portion 51, a lower cross portion 52, the left side portion 53, and the right side portion 54 as a configuration which enables the vehicle 1 to lean. Additionally, the link mechanism 5 includes the first bracket 317 and the left shock absorber 33 as a configuration that is connected to a lower portion of the left side portion 53 so as to lean together with the left side portion 53. Further, the link mechanism 5 includes the second bracket 327 and the right shock absorber 34 as a configuration that is connected to a lower portion of the right side portion 54 so as to lean together with the right side portion 54.

The right side portion 54 supports an upper portion of the right shock absorber 34 so as to turn about a right steering axis Y2 that extends in the up-and-down direction of the body frame 21. The left side portion 53 supports an upper portion of the left shock absorber 33 so as to turn a left steering axis Y1 that is parallel to the right steering axis Y2.

The upper cross portion 51 supports the upper portion of the right side portion 54 at the right end portion thereof so as to turn around an upper right axis E extending in the front-and-rear direction of the body frame 21, supports the upper portion of the left side portion 53 at the left end portion thereof so as to turn around an upper left axis D which is parallel to the upper right axis E, and the middle portion thereof is supported on the body frame 21 so as to turn around an upper middle axis C which is parallel to the upper right axis E and the upper left axis D.

The lower cross portion 52 supports the lower portion of the right side portion 54 at the right end portion thereof so as to turn around a lower right axis H which is parallel to the upper right axis E, supports the lower portion of the left side portion 53 at the left end portion thereof so as to turn around a lower left axis G which is parallel to the upper left axis E, and the middle portion thereof is supported on the body frame 21 so as to turn around a lower middle axis F which is parallel to the upper middle axis C.

The upper cross portion 51 includes a plate-shaped member 512 which is provided in front of the headstock 211 and extends in the vehicle's width direction. The plate-shaped member 512 is supported on the headstock 211 by a support portion that is located at a center in the left-and-right direction and turns relative to the headstock 211 about an upper middle axis C that extends in the front-and-rear direction.

The upper cross portion 51 includes the plate-shaped member 512 that extends in the widthwise or transverse direction of the vehicle. The plate-shaped member 512 is disposed on a front side of the headstock 211. A left end of the upper cross portion 51 is connected to the left side portion 53 by a supporting portion. The upper cross portion 51 turns relative to the left side portion 53 about an upper left axis D that extends in the front-to-rear direction. A right end of the upper cross portion 51 is connected to the right side portion 54 by a connecting portion. The upper cross portion 51 turns relative to the right side portion 54 about an upper right axis E that extends in the front-to-rear direction.

The lower cross portion 52 is supported on the headstock 211 via the support portion and turns around the lower middle axis F extending in the front-and-rear direction. The lower cross portion 52 is disposed below the upper cross portion 51. The lower cross portion 52 has substantially the same widthwise length as that of the upper cross portion 51 in relation to the vehicle's width direction and is disposed parallel to the upper cross portion 51.

The lower cross portion 52 includes a pair of plate-shaped members 522, 522 that extend in the vehicle's width direction. The pair of plate-shaped members 522, 522 is disposed so as to hold the headstock 211 therebetween in the front-and-rear direction. The pair of plate-shaped members 522, 522 is connected integrally to each other by a middle portion 523. The middle portion 523 may be integral with or separated from the pair of the plate-shaped members 522, 522. A left end of the lower cross portion 52 is connected to the left side portion 53 by a supporting portion. The lower cross portion 52 turns relative to the left side portion 53 about the lower left axis G that extends substantially in the front-and-rear direction. A right end of the lower cross portion 52 is connected to the right side portion 54 by a supporting portion. The lower cross portion 52 turns relative to the right side portion 54 around the lower right axis H extending in the front-and-rear direction.

The left side portion 53 is disposed directly on the left of the headstock 211 and extends parallel to the direction in which the headstock 211 extends. The left side portion 53 is disposed directly above the left front wheel 31 and above the left shock absorber 33. The left side portion 53 is connected to the first bracket 317 at the lower portion thereof and is attached to the first bracket 317 so as to turn about the left steering axis Y1. This left side portion 53 supports an upper portion of the left shock absorber 33 so as to turn about the left steering axis Y1.

The right side portion 54 is disposed directly on the right of the headstock 211 and extends in the direction in which the headstock 211 extends. The right side portion 54 is disposed directly above the right front wheel 32 and above the right shock absorber 34. The right side portion 54 is connected to the second bracket 327 at the lower portion thereof and is attached to the second bracket 327 so as to turn about the right steering axis Y2. This right side portion 54 supports an upper portion of the right shock absorber 34 so as to turn about the right steering axis Y2.

In this manner, the upper cross portion 51, the lower cross portion 52, the left side portion 53, and the right side portion 54 are connected together in such a posture that the upper cross portion 51 and the lower cross portion 52 become parallel to each other and that the left side portion 53 and the right side portion 54 become parallel to each other.

Figure 4:
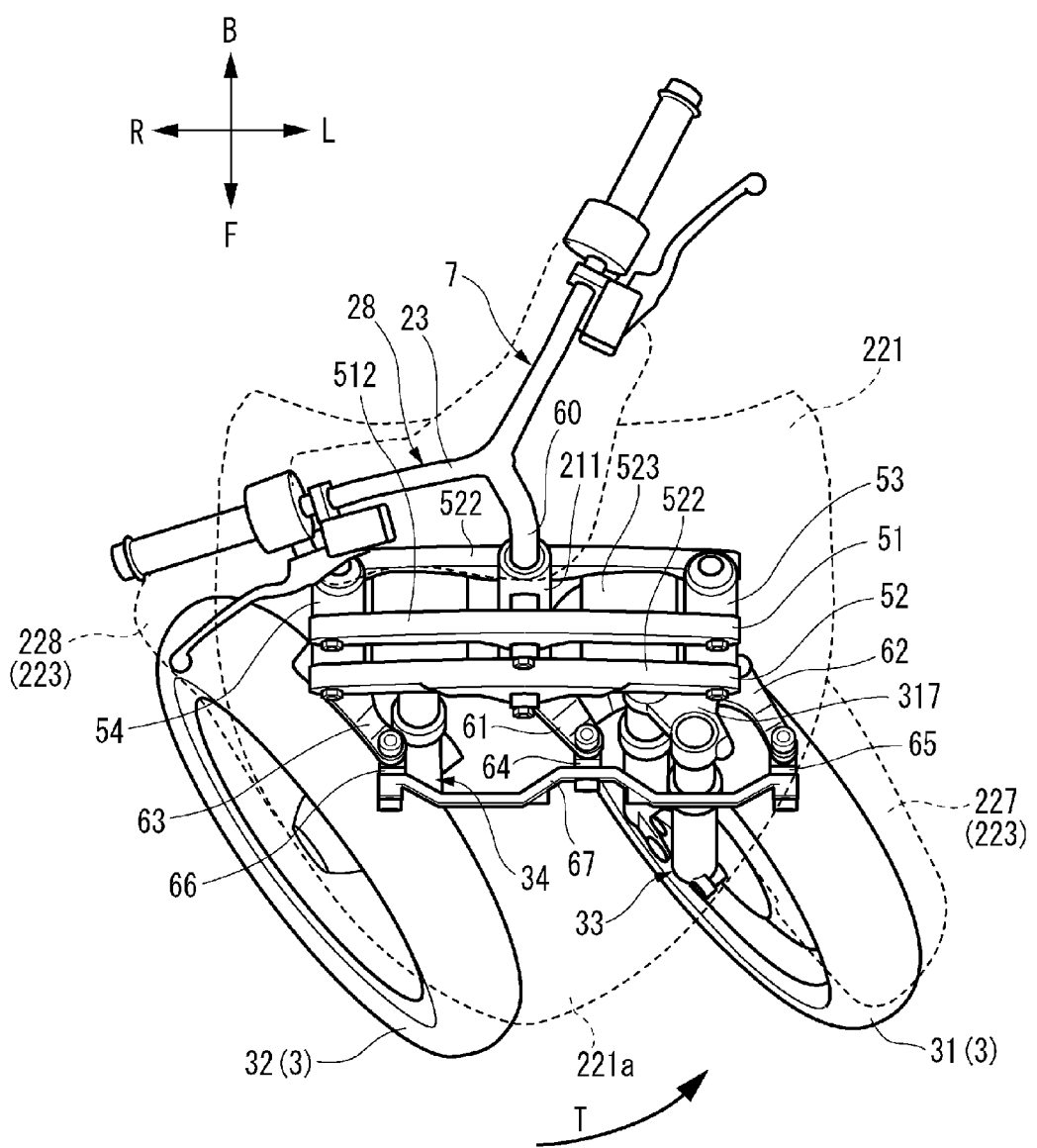
FIG. 4 is a plan view of the front portion of the vehicle in a state where the vehicle shown in FIG. 1 is steered.

FIG. 4 is a plan view of the front portion of the vehicle 1 when the vehicle 1 is steered to be turned, depicting the steering operation of the vehicle 1.

As shown in FIG. 4, when the handlebar 23 is turned in the left-and-right direction, the wheel turning operation transmission mechanism 6 of the steering mechanism 7 is activated to operate, so that a steering operation is performed. When the steering shaft 60 turns as a result of the handlebar 23 being turned, the first transmission plate 61 turns as the steering shaft 60 turns. In particular, the front wheels 3 are turned by the wheel turning operation transmission mechanism 6 which moves in response to the turning of the steering shaft 60.

For example, when the steering shaft 60 turns in a direction indicated by an arrow T in FIG. 4, the tie-rod 67 moves leftward and rearward in association with the turning of the first transmission plate 61. As this occurs, the first transmission plate 61 is allowed to turn relative to the first joint 64 by the turning shaft of the first joint 64 that extends substantially in the up-and-down direction, and the tie-rod 67 moves leftward and rearward while maintaining its posture. The second transmission plate 62 and the third transmission plate 63 turn in the direction indicated by the arrow T about the left side portion 53 and the right side portion 54, respectively, as the tie-rod 67 moves leftward and rearward. As this occurs, the second transmission plate 62 turns relative to the second joint 65 about the rotating shaft of the second joint 65 that extends in the up-and-down direction, and the third transmission plate 63 turns relative to the third joint 66 about the rotating shaft of the third joint 66 that extends in the up-and-down direction.

When the second transmission plate 62 and the third transmission plate 63 turn in the direction indicated by the arrow T, the first bracket 317 and the second bracket 327 turn in the direction indicated by the arrow T. When the first bracket 317 and the second bracket 327 turn in the direction indicated by the arrow T, the left front wheel 31 turns about the left steering axis Y1 (refer to FIG. 2) via the left shock absorber 33, and the right front wheel 32 turns about the right steering axis Y2 (refer to FIG. 2) via the right shock absorber 34.

FIG. 5 is a front view of the front portion of the vehicle 1 when the vehicle 1 is steered to be turned, depicting a leaning operation of the vehicle 1.

As shown in FIG. 5, the vehicle 1 leans to the left-and-right direction of the vehicle 1 in accordance with the operation of the link mechanism 5. The operation of the link mechanism 5 means that the individual members (the upper cross portion 51, the lower cross portion 52, the left side portion 53, and the right side portion 54) that activate a leaning operation in the link mechanism 5 turn relatively about their connecting points as axes so as to change the shape of the link mechanism 5.

In the link mechanism 5 of this preferred embodiment, for example, the upper cross portion 51, the lower cross portion 52, the left side portion 53, and the right side portion 54 which define a rectangular or substantially rectangular shape when viewed from the front with the vehicle 1 being in the upright state turn to change their shape into a parallelogram shape in such a state that the vehicle leans. The link mechanism 5 performs a leaning operation in association with the relative turning operation of the upper cross portion 51, the lower cross portion 52, the left side portion 53, and the right side portion 54 to cause the left front wheel 31 and the right front wheel 32 to lean accordingly.

For an example, when the rider causes the vehicle 1 to lean to the left, the headstock 211 leans to the left of the vehicle 1 relative to the vertical direction. When the headstock 211 leans, the upper cross portion 51 turns relative to the headstock 211 about the upper middle axis C, and the lower cross portion 52 turns relative to the headstock 211 about the lower middle axis F. Then, the upper cross portion 51 moves farther leftward than the lower cross portion 52, and the left side portion 53 and the right side portion 54 lean from the vertical direction while being kept parallel to the headstock 211. The left side portion 53 and the right side portion 54 turn relative to the upper cross portion 51 and the lower cross portion 52 when the left side portion 53 and the right side portion 54 lean. Consequently, when the vehicle 1 is caused to lean, the left front wheel 31 and the right front wheel 32 that are supported on the left side portion 53 and the right side portion 54, respectively, lean while being kept parallel to the headstock 211 relative to the vertical direction as the left side portion 53 and the right side portion 54 lean.

In addition, during the leaning operation, the tie-rod 67 turns relative to the shaft portions of the first joint 64, the second joint 65, and the third joint 66 that extend in the front-and-rear direction. This allows the tie rod 67 to maintain its parallel posture to the upper cross portion 51 and the second cross portion 52 even though the vehicle 1 leans.

Figure 6:
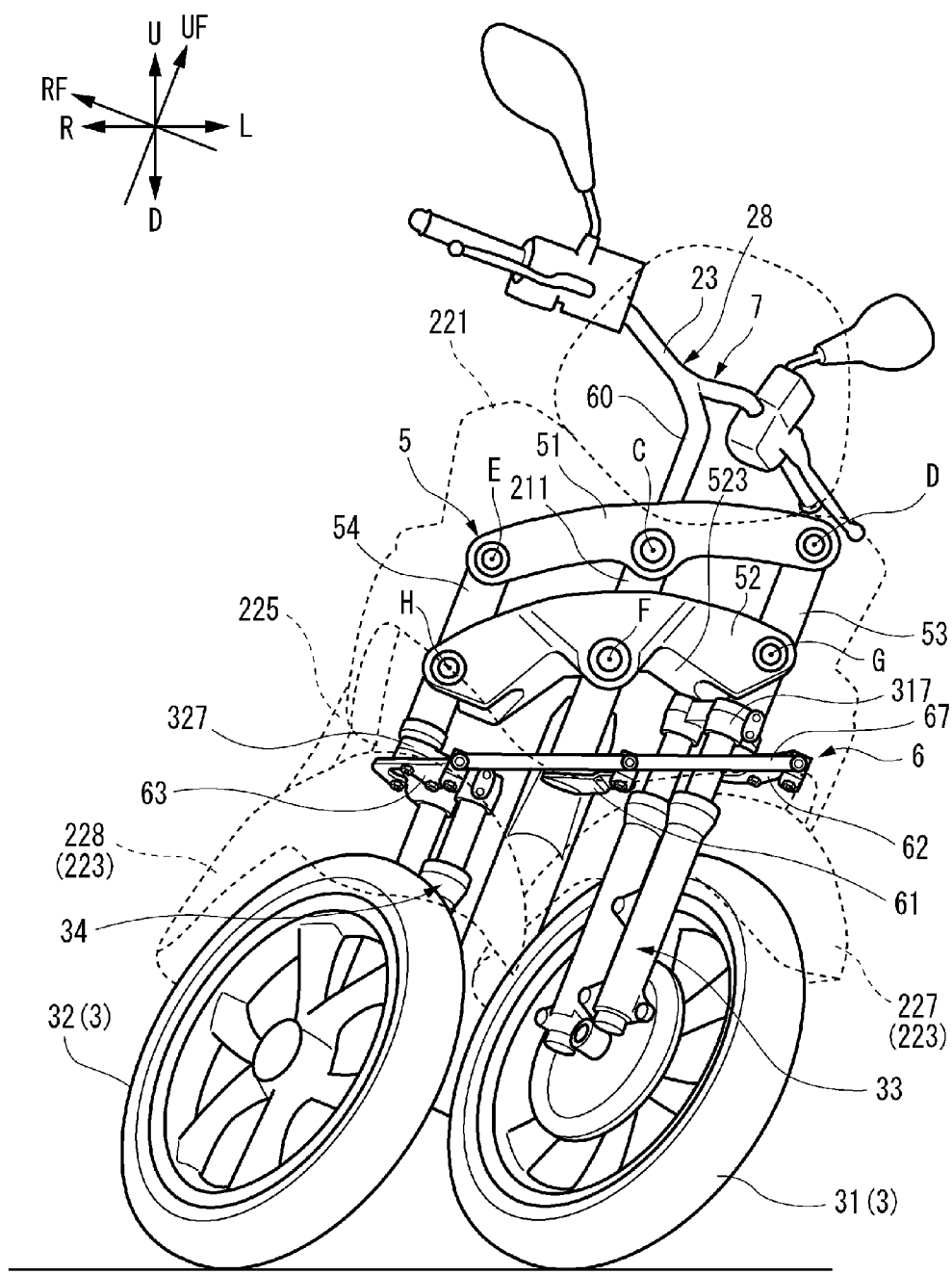
FIG. 6 is a front view of the front portion of the vehicle in a state where the vehicle shown in FIG. 1 is steered and is caused to lean.

FIG. 6 is a front view of the front portion of the vehicle 1 in such a state that the vehicle 1 is steered and caused to lean.

In FIG. 6, the vehicle 1 is steered to the left and is caused to lean to the left thereof. When the vehicle 1 operates as illustrated in FIG. 6, the directions of the left front wheel 31 and the right front wheel 32 are changed by the steering operation, and both the left front wheel 31 and the right front wheel 32 are caused to lean together with the body frame 21 by the leaning operation. In this state, the upper cross portion 51, the lower cross portion 52, the left side portion 53, and the right side portion 54 of the link mechanism 5 are turned to change their shape into a parallelogram, so that the tie-rod 67 moves leftward or rightward, that is, in a direction in which the vehicle 1 is steered (leftward in FIG. 6) and rearward.

Next, using FIGS. 7 to 14, a brake hose will be described which is provided on the vehicle 1 described above.

Figure 7:
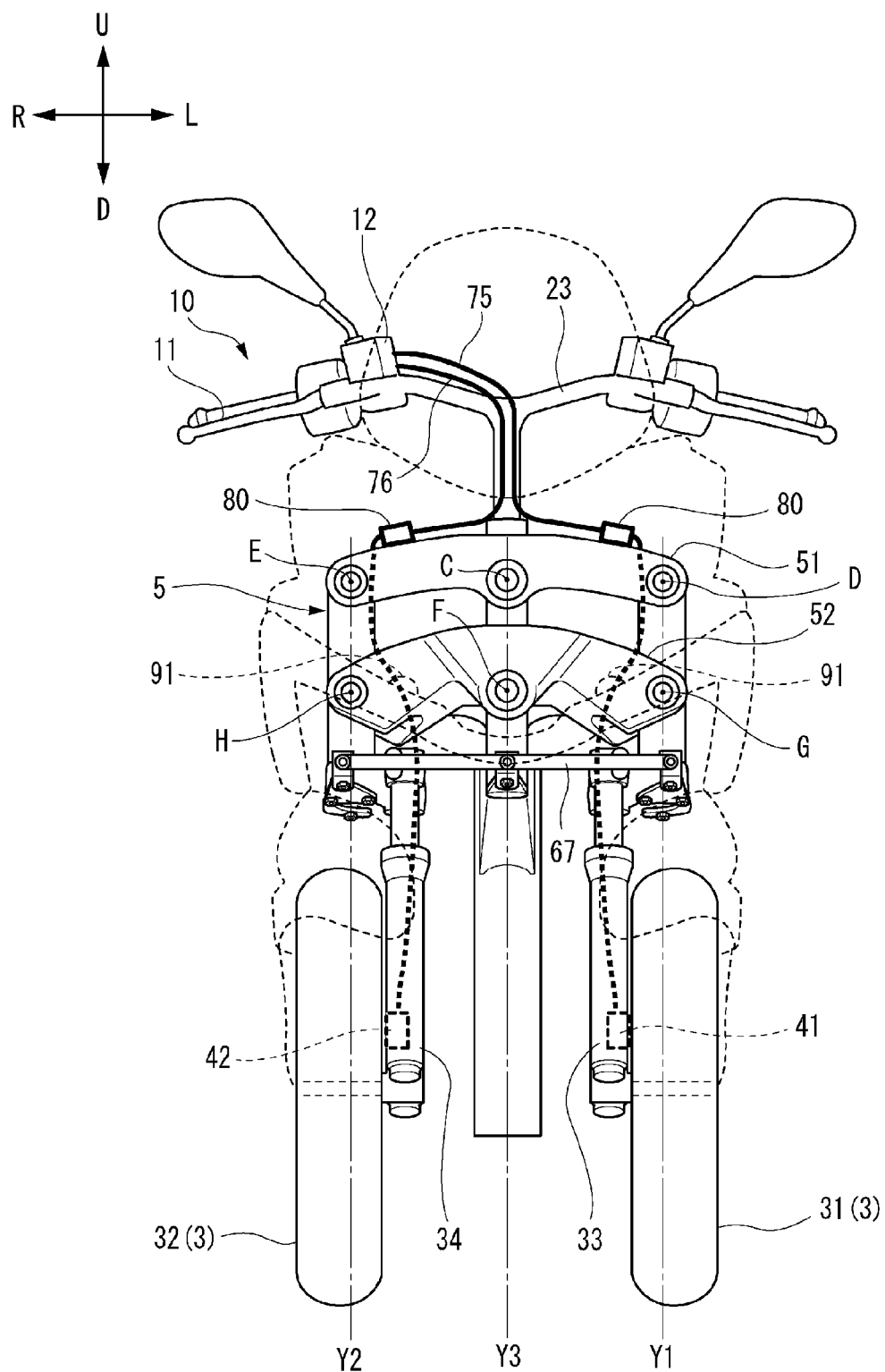
FIG. 7 is a front view of the vehicle that is in an upright state, shown together with a brake hose.
Figure 8:
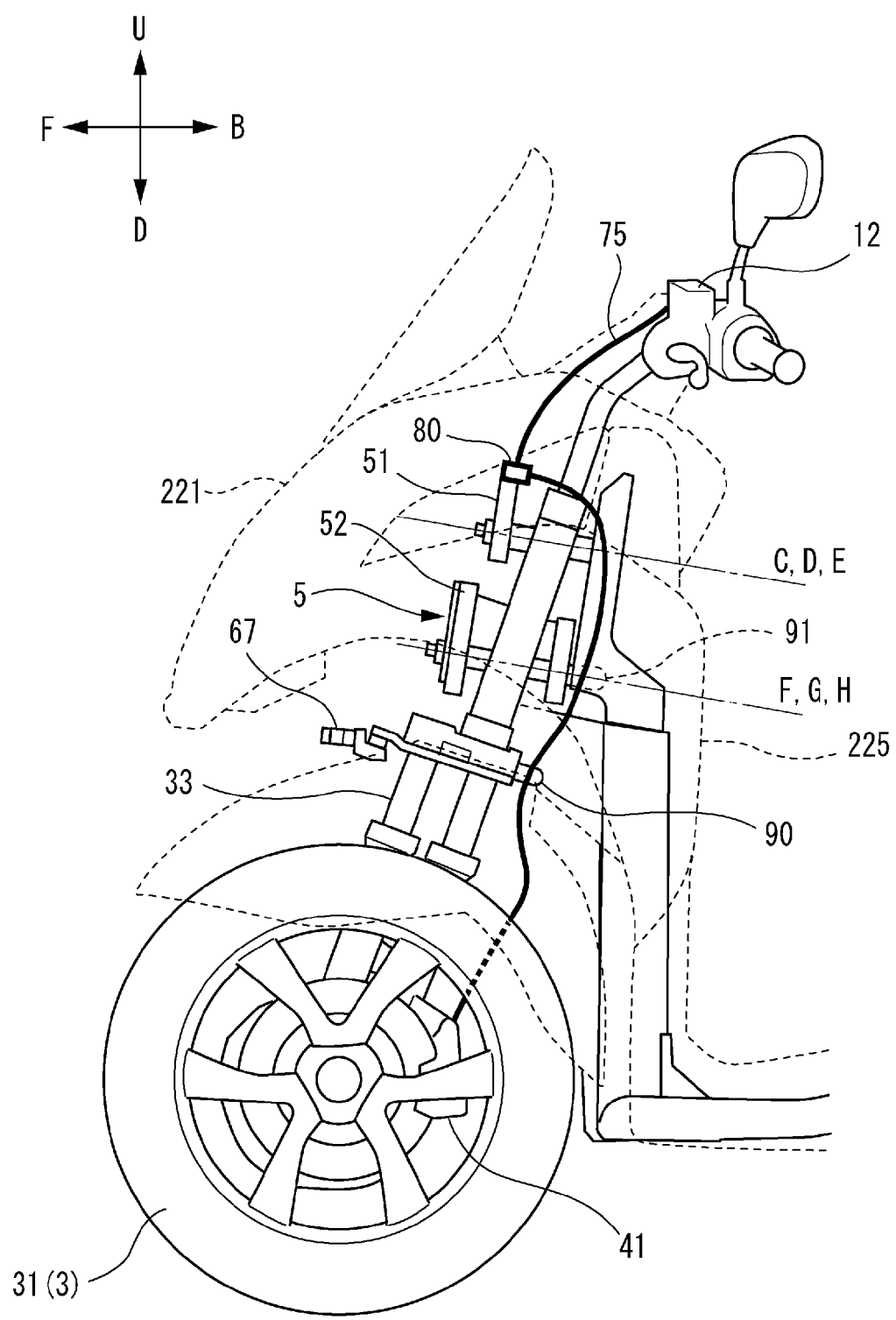
FIG. 8 is a side view of the vehicle shown in FIG. 7.
Figure 9:
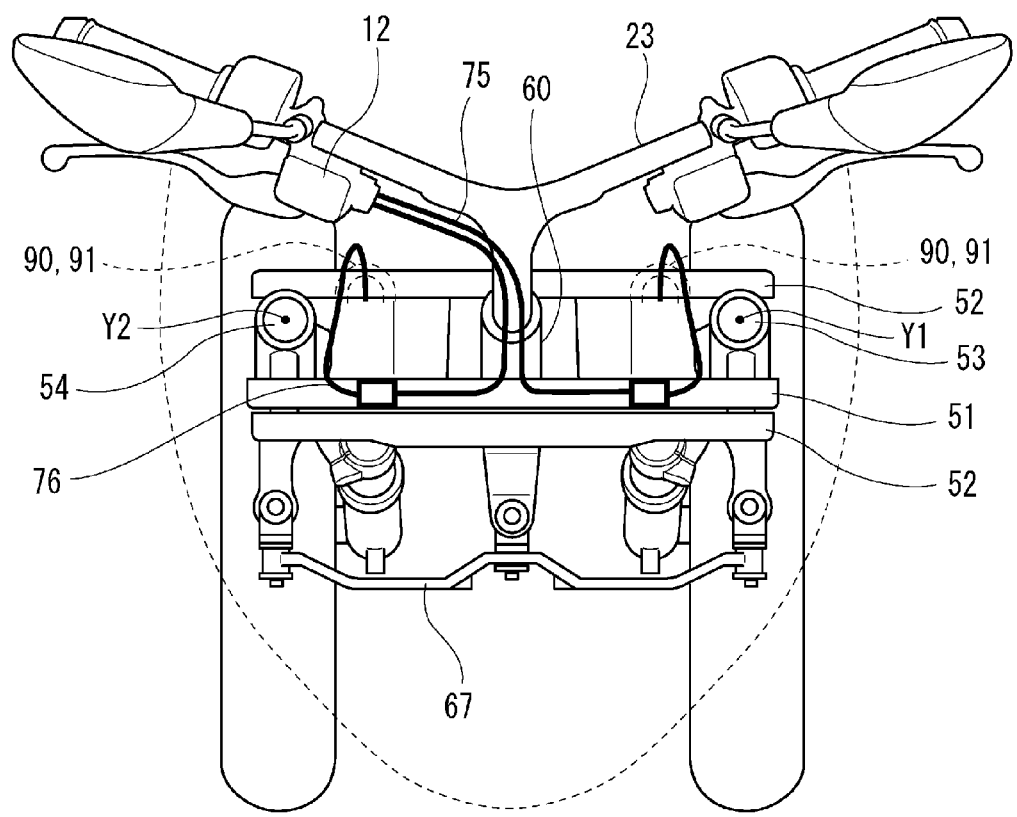
FIG. 9 is a plan view of the vehicle shown in FIG. 7.

Firstly, using FIGS. 7 to 9, the brake hose will be described when the vehicle 1 is in the upright state. The upright state of the vehicle 1 means a state in which the vehicle 1 does not lean and the front wheels are not turned. FIG. 7 is a front view of the vehicle 1 that is in the upright state, shown together with the brake hose. FIG. 8 is a side view of the vehicle 1 shown in FIG. 7. FIG. 9 is a plan view of the vehicle 1 shown in FIG. 7.

As shown in FIGS. 7 to 9, a left brake caliper 41 is a brake device that is fixed to a lower portion of the left shock absorber 33 (an example of a left suspension device). The left brake caliper 41 is provided on a rear side of a lower portion of the rear telescopic element (refer to FIG. 8). The left brake caliper 41 is provided below the link mechanism 5.

The left brake caliper 41 includes brake pads, not shown. The left brake caliper 41 applies a braking force to the left front wheel 31 by holding a brake disc that rotates together with the left front wheel 31 by the brake pads therebetween.

Additionally, a right brake caliper 42 is a brake device that is fixed to a lower portion of the right shock absorber 34 (an example of a right suspension device). The right brake caliper 42 is provided on a rear side of a low portion of the rear telescopic element of the two telescopic elements that are aligned back and forth in the front-and-rear direction. The right brake caliper 42 is provided below the link mechanism 5.

The right brake caliper 42 includes brake pads, not shown. The right brake caliper 42 applies a braking force to the right front wheel 32 by holding a brake disc that rotates together with the right front wheel 32 by the brake pads therebetween.

A brake controller 10 is attached to an upper portion of a right portion of the handlebar 23 that is located above the link mechanism 5. The brake controller 10 includes a brake lever 11 and a master cylinder 12. Operating the brake lever 11 increases the pressure of a brake fluid in an interior of the master cylinder 12.

In this preferred embodiment, the brake hose (an example of the brake controlling operation transmission member) includes a left brake hose 75 and a right brake hose 76. The left brake hose 75 connects the master cylinder 12 to a left brake caliper 41. The right brake hose 76 connects the master cylinder 12 to the right brake caliper 42. The left brake hose 75 and right brake hose 76 are preferably each a tube made of a flexible rubber, for example.

When the brake fluid under high pressure in the interior of the left brake hose 75 is applied to the left brake caliper 41, the left brake caliper 41 applies a braking force to the left front wheel 31. The left brake hose 75 transmits a brake controlling operation that is inputted into the brake controller 10 to the left brake caliper 41 in the manner described above.

Similarly, when the brake fluid under high pressure in an interior of the right brake hose 76 is applied to the right brake caliper 42, the right brake caliper 42 applies a braking force to the right front wheel 32. In this manner, the right brake hose 76 transmits the brake controlling operation that is inputted into the brake controller 10 to the right brake caliper 42.

A restrictor 80 that prevents the movement of the brake hose is provided at an upper portion of at least one of the upper cross portion 51, the right side portion 54, and the left side portion 53. In this preferred embodiment, two restrictors 80 are fixed to an upper surface of the upper cross portion 51 in the left-and-right direction. The restrictors 80 prevent a radial movement of the brake hose while permitting a slight longitudinal movement of the brake hose. As the restrictors, for example, a metal fastener, a rubber bush, a sleeve and the like can be used.

In relation to the left-and-right direction of the body frame 21, a right restrictor 80 (a right restrictor) is provided at a right portion of the vehicle 1, and a left restrictor 80 (a left restrictor) is provided at a left portion of the vehicle 1. It is noted that when looking at the vehicle 1 from the front thereof, a right half portion of the vehicle 1 that is divided into two halves is referred to as the right portion of the vehicle and a left half portion of the vehicle 1 that is divided into two halves is referred to as a left half portion.

A guide portion 90 is fixed to a rear side of an upper portion of the rear telescopic element of the two telescopic elements of the left shock absorber 33 that are aligned back and forth in the front-and-rear direction. Similarly, a guide portion 90 is fixed to a rear side of an upper portion of the rear telescopic element of the two telescopic elements of the right shock absorber 34. These guide portions 90 are ring-shaped members through interiors of which the brake hose is inserted. The guide portions 90 prevent a radial movement of the brake hose while permitting a longitudinal movement of the brake hose. The guide portions 90 restrict the right brake hose 76 and the left brake hose 75 from moving toward the front wheels 3.

As shown in FIG. 7, the left brake hose 75 extends to the right along the handlebar 23, is then bent downward along the steering shaft 60 and further extends to the left along the upper surface of the upper cross portion 51 to be restrained by the restrictor 80.

Additionally, as shown in FIG. 8, the left brake hose 75 extends downward from the restrictor 80 on a rear side of the link mechanism 5, passes through the guide portion 90, is bent toward the rear below the guide portion 90 and connects to the left brake caliper 41.

As shown in FIG. 7, the right brake hose 76 extends to the right along the handlebar 23, is then bent downward along the steering shaft 60 and further extends to the right along the upper surface of the upper cross portion 51 to be restrained by the restrictor 80.

Additionally, as shown in FIG. 8, the right brake hose 76 extends downward from the restrictor 80 on the rear side of the link mechanism 5, passes through the guide portion 90, is bent toward the rear below the guide portion 90 and connects to the right brake caliper 42.

Figure 10:
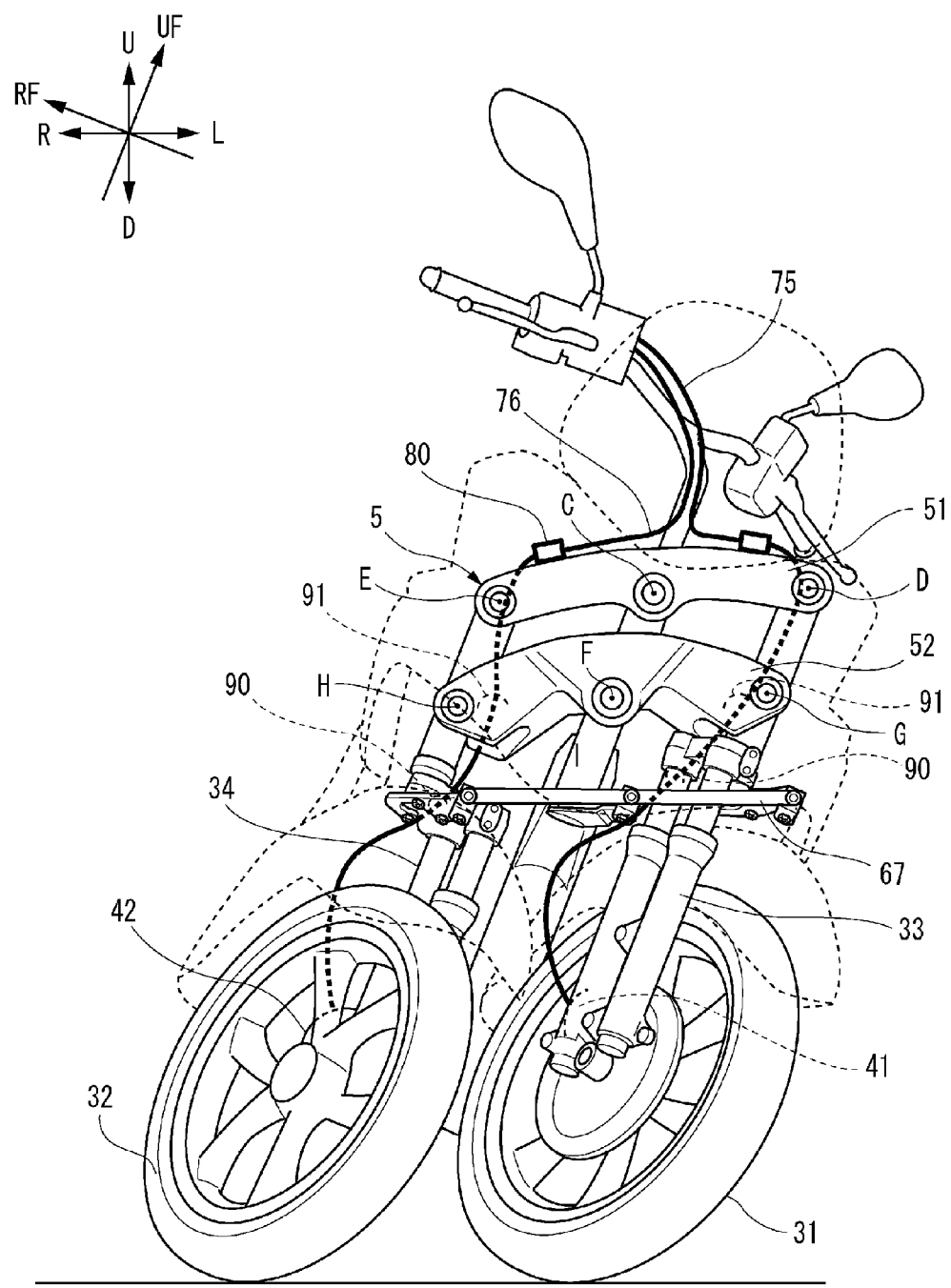
FIG. 10 is a front view of the vehicle shown in FIG. 7 showing a state in which the vehicle is caused to lean and front wheels are turned.

FIG. 10 is a front view of the vehicle 1 showing a state in which the vehicle 1 is caused to lean and front wheels 3 are turned.

When the vehicle 1 is caused to lean as shown in FIG. 10 from the upright state shown in FIG. 7, the relative positions of the master cylinder 12 and the left brake caliper 41 and the relative positions of the master cylinder 12 and the right brake caliper 42 change. The brake hose includes leaning associated deforming portions S (refer to FIG. 11) that deform in response to the leaning of the body frame 21 so as to follow the changes of the relative positions. The leaning associated deforming portions S deflect, bend or twist when the vehicle 1 is caused to lean.

When the front wheels 3 are turned as shown in FIG. 10 from the upright state shown in FIG. 7, the relative positions of the master cylinder 12 and the left brake caliper 41 and the relative positions of the master cylinder 12 and the right brake caliper 42 change. Because of this, the brake hose includes wheel turning associated deforming portions T (refer to FIG. 13) that deform in response to the turning of the right front wheel 32 and the left front wheel 31 so as to follow the changes of the relative positions. The wheel turning associated portions T also deflect, bend or twist when the front wheels 3 are turned.

When the vehicle 1 is caused to lean and the front wheels 3 are turned in the manner described above, the link mechanism 5, the tie-rod 67, the left shock absorber 33, the right shock absorber 34, the front wheels 3 and the like are displaced relative to one another with respect to the steering shaft 60. The brake hose deforms so as to follow the relative displacements of those constituent members while preventing the interference thereof with those members.

While the vehicle 1 and the front wheels 3 are shown as being caused to lean and turned, respectively, in FIG. 10, to facilitate the understanding of deformations of the deforming portions, the leaning of the vehicle 1 and the turning of the front wheels 3 will be described separately.

Figure 11:
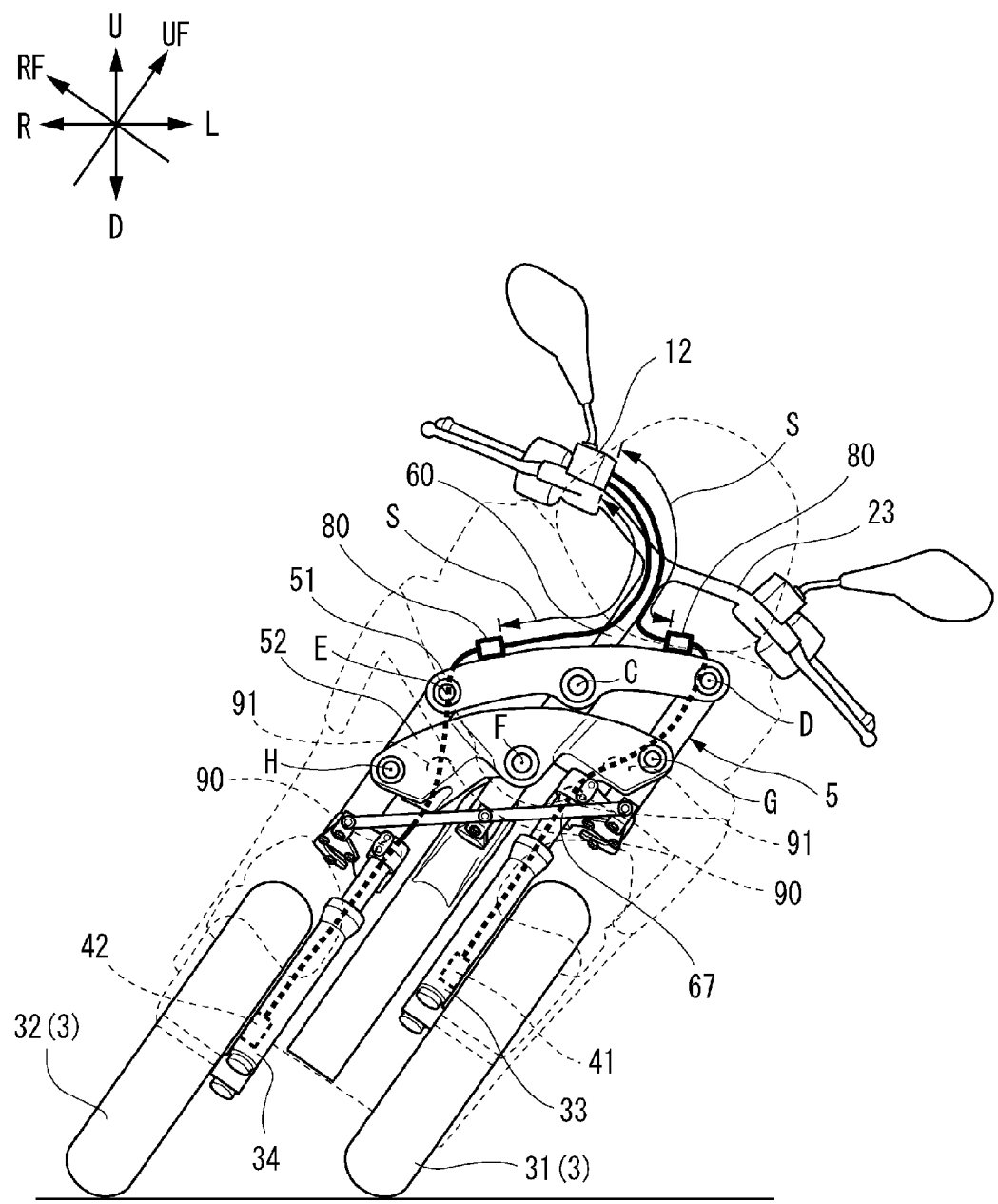
FIG. 11 is a front view of the vehicle shown in FIG. 7 showing a state in which the vehicle is caused to lean.
Figure 12:
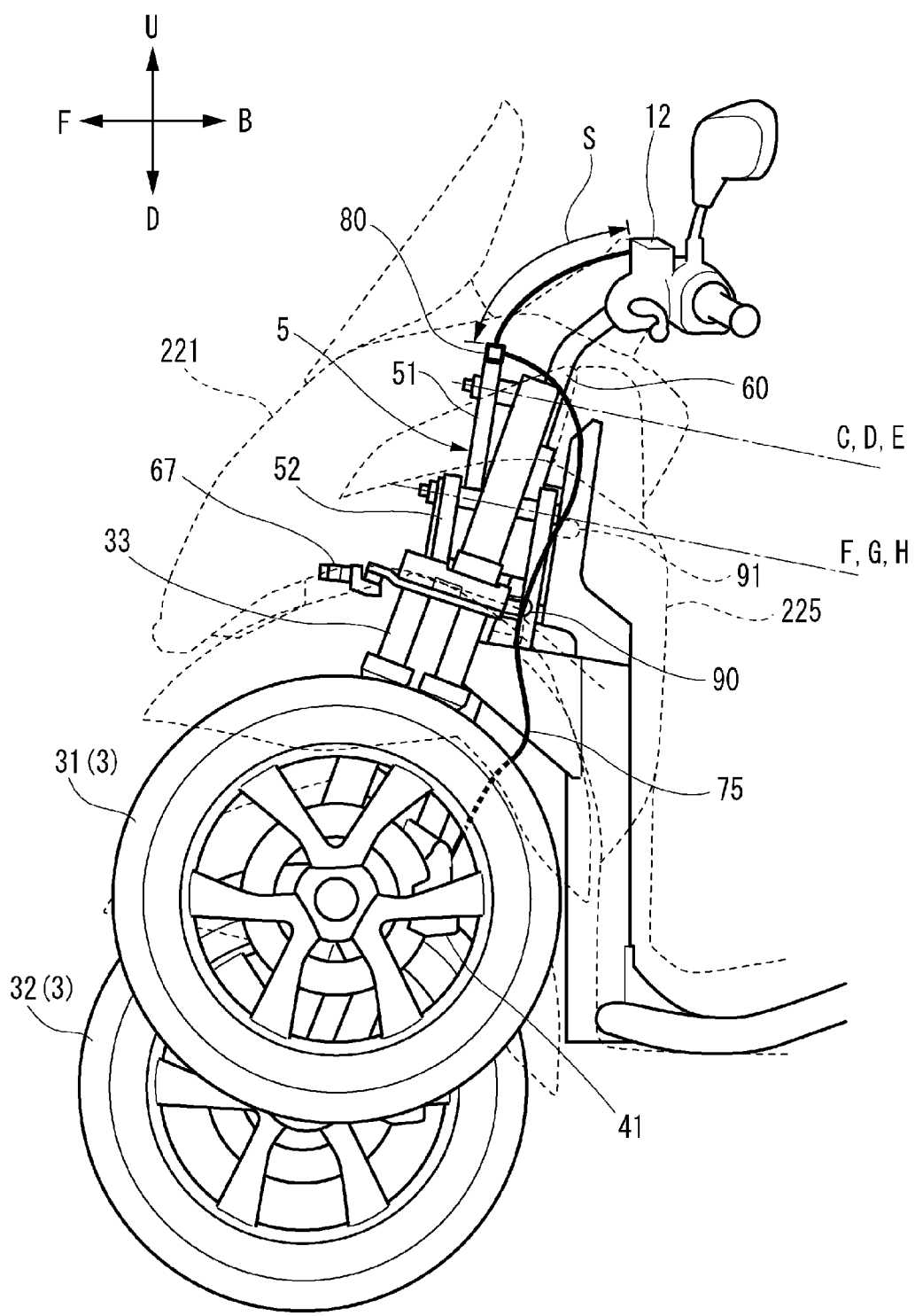
FIG. 12 is a side view of the vehicle shown in FIG. 11.

Firstly, with reference to FIGS. 11 and 12, the leaning associated deforming portion S will be described. FIG. 11 is a front view of the vehicle 1 showing a state in which the vehicle 1 is caused to lean. FIG. 12 is a side view of the vehicle 1 shown in FIG. 11.

The leaning associated deforming portions S are located between the brake controller 10 and the restrictors 80. In the vehicle 1 of this preferred embodiment, sections of the left brake hose 75 and the right brake hose 76 that are located between the master cylinder 12 and the restrictors 80 correspond to the leaning associated deforming portions S. When the vehicle 1 is caused to lean to the left of the vehicle 1 as shown in FIG. 11 from the upright state shown in FIG. 7, the master cylinder 12 moves away from the left restrictor 80 and moves toward the right restrictor 80. The leaning associated deforming portions S deform to follow the changes in the relative positions of the master cylinder 12 and the restrictors 80.

More specifically, when the vehicle 1 is caused to lean to the left of the vehicle 1, a left leaning associated deforming portion S deforms so that an angle defined by a portion that extends along the steering shaft 60 in the up-and-down direction and a portion that extends on the upper surface of the upper cross portion 51 in the left-and-right direction becomes small. In addition, a right leaning associated deforming portion S deforms so that an angle defined by a portion that extends along the steering shaft 60 in the up-and-down direction and a portion that extends on the upper surface of the upper cross portion 51 in the left-and-right direction becomes large. Since the leaning associated deforming portions S are provided directly above the link mechanism 5, it prevents the link mechanism 5 that operates as the vehicle 1 leans and the leaning associated deforming portions S from interfering with each other. In addition, since the restrictors 80 are fixed to the upper cross portion 51 of the link mechanism 5 that operates as the vehicle 1 leans, it is easy for the leaning associated deforming portions S to deform as the vehicle 1 leans.

Figure 13:
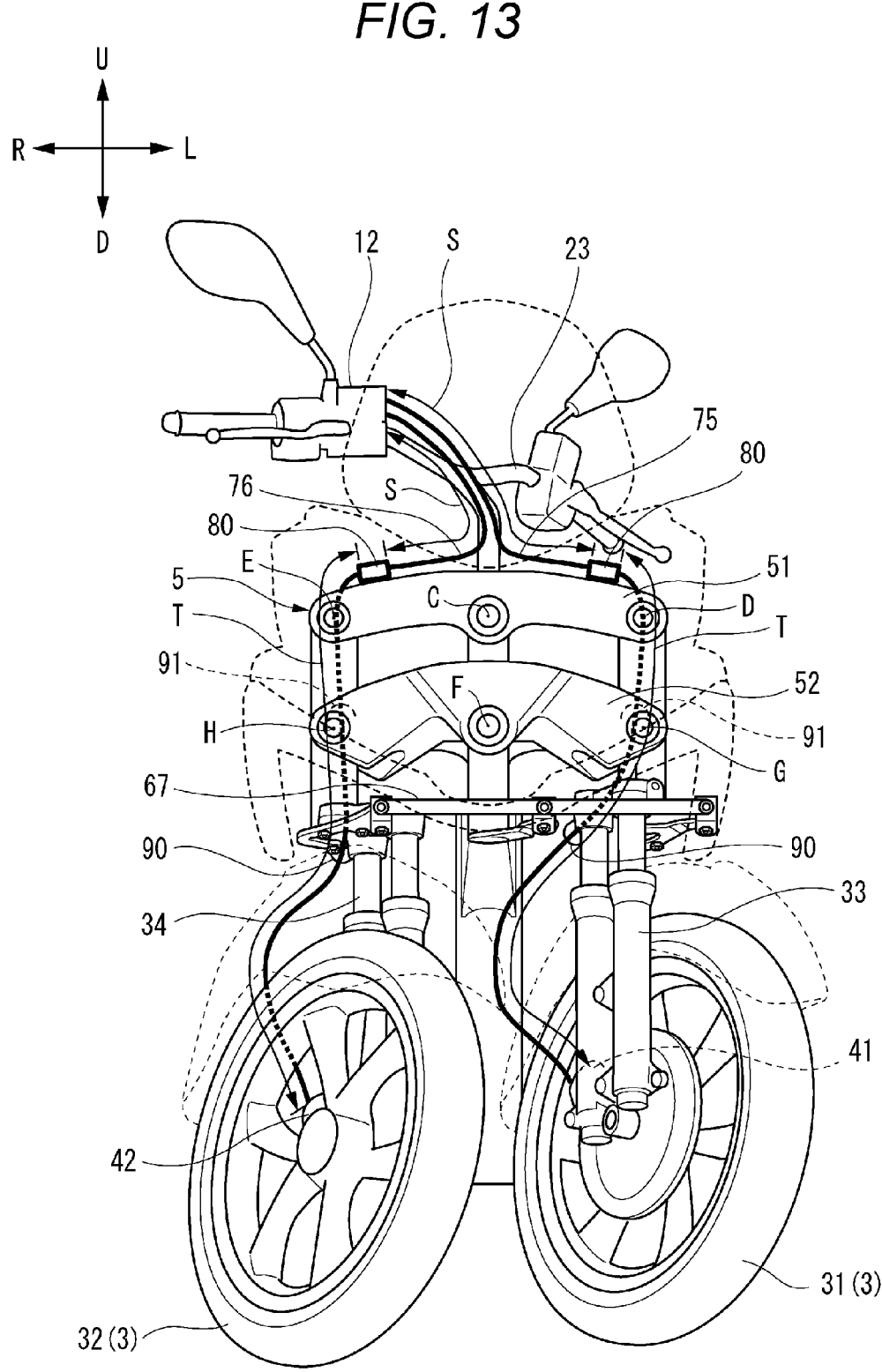
FIG. 13 is a front view of the vehicle shown in FIG. 7 showing a state in which the front wheels are turned.
Figure 14:
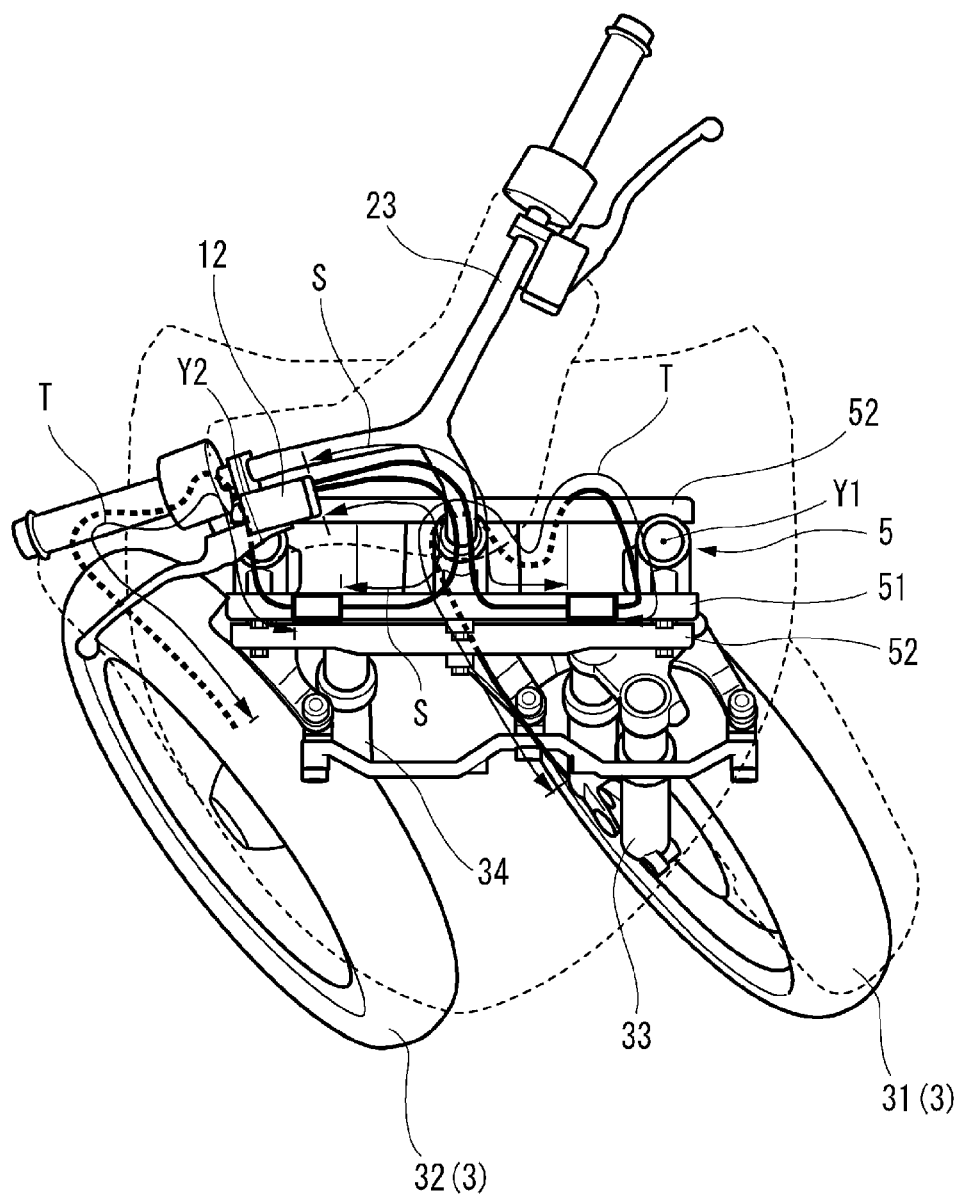
FIG. 14 is a plan view of the vehicle shown in FIG. 13.

Next, with reference to FIGS. 13 and 14, the wheel turning associated deforming portion T will be described. FIG. 13 is a front view of the vehicle 1 showing a state in which the front wheels 3 are turned. FIG. 14 is a plan view of the vehicle 1 shown in FIG. 13.

At least portions of the wheel turning associated deforming portions T are located between the leaning associated deforming portions S and the left and right brake calipers 41, 42. In the vehicle 1 of this preferred embodiment, a portion of the restrictor 80 of the left brake hose 75 and the left brake caliper 41 corresponds to the wheel turning associated deforming portion T, and a portion of the restrictor 80 of the right brake hose 76 to the right brake caliper 42 corresponds to the wheel turning associated deforming portion T. When the front wheels 3 are turned in such a way that the traveling direction is oriented to the left as shown in FIG. 13 from the upright state shown in FIG. 7, as shown in FIGS. 13 and 14, portions of the brake hose extending from the guide portions 90 to the brake calipers 41, 42 deform.

At least a portion of the wheel turning associated deforming portion T is located between the right restrictor 80 and the right brake device 42 to deform in response to the turning of the right front wheel 32 about the right steering axis Y2. Additionally, at least a portion of the wheel turning associated deforming portion T is located between the left restrictor 80 and the left brake device 41 to deform in response to the turning of the left front wheel 31 about the left steering axis Y1.

More specifically, as shown in FIGS. 13 and 14, the left wheel turning associated deforming portion T is twisted in a counterclockwise direction as seen from thereabove by the left guide portion 90 that is attached to the left shock absorber 33 that turns together with the left front wheel 31. In association with this twisting of the left wheel turning associated deforming portion T, a portion that is curved from the guide portion 90 to the rear between the guide portion 90 and the left brake caliper 41 moves to the left. Since a rear portion of the left front wheel 31 also moves to the left in a similar fashion, the left wheel turning associated deforming portion T is prevented from interfering with the left front wheel 31.

In addition, the right wheel turning associated deforming portion T is twisted in a counterclockwise direction as seen from thereabove by the right guide portion 90 that is attached to the right shock absorber 34 that turns together with the right front wheel 32. Since a portion of the right wheel turning associated deforming portion T that is curved to the rear also moves together with a rear portion of the right front wheel 32, the right wheel turning associated deforming portion T is also prevented from interfering with the right front wheel 32.

In this preferred embodiment, the wheel turning associated deforming portions T also function as shock absorber-associated deforming portions that deform in response to the operation of the left shock absorber 33 and the right shock absorber 34.

When a relative distance between the axle shaft of the left front wheel 31 and the guide portion 90 becomes longer as a result of the operation of the left shock absorber 33, the left brake hose 75 extending between the guide portion 90 and the left brake caliper 41 deforms so as to become rectilinear. Additionally, when the relative distance between the axle shaft of the left front wheel 31 and the guide portion 90 becomes shorter, the left brake hose 75 extending between the guide portion 90 and the left brake caliper 41 is bent toward the rear so that a radius of curvature becomes smaller.

Additionally, when a relative distance between the axle shaft of the right front wheel 32 and the guide portion 90 becomes longer as a result of the operation of the right shock absorber 34, the right brake hose 76 extending between the guide portion 90 and the right brake caliper 42 deforms so as to become rectilinear. Additionally, when the relative distance between the axle shaft of the right front wheel 32 and the guide portion 90 becomes shorter, the right brake hose 76 extending between the guide portion 90 and the right brake caliper 42 is bent toward the rear so that a radius of curvature becomes smaller.

In this manner, the interference of the brake hose with the right shock absorber 34 and the left shock absorber 33 is prevented.

The right front wheel 32 and the left front wheel 31 are provided at the lower portion of the front portion of the vehicle 1. The space is provided between the right member (the right front wheel 32, the right shock absorbing device 34, and the right brake device 42) that turns relative to the body frame 21 and the body frame 21 and the body part that is fixed to the body frame 21 to prevent the interference therebetween when the right front wheel 32 is turned. The space is provided between the left member (the left front wheel 31, the left shock absorbing device 33, and the left brake device 41) that turns relative to the body frame 21 and the body frame 21 and the body portion to prevent the interference therebetween when the left front wheel 31 is turned.

The space that is secured to prevent the interference of the right member with the body frame 21 and the body portion and the space that is secured to prevent the interference of the left member with the body frame 21 and the body portion are spaces where no additional members are desired to be disposed. Then, it is undesirable to attempt to dispose the deforming portions of the brake hose in these spaces.

In the vehicles 1 of U.S. Design Pat. No. 547,242 and Catalogo parti di ricambio, MP3 300 ie LT Mod. ZAPM64102, Piaggio that have been described above, the deforming portions of the brake hose are collected at a location directly above the upper cross portion altogether. Because of this, the brake hose is laid out compactly.

As has been described above, however, in the vehicles 1 of U.S. Design Pat. No. 547,242 and Catalogo parti di ricambio, MP3 300 ie LT Mod. ZAPM64102, Piaggio, although the brake hose itself is laid out compactly, a design of the suspension device and the front wheel is restricted and the front portion of the vehicle 1 is enlarged.

The inventor studied in detail the movement of the brake controlling operation transmission member and the operation of the link mechanism 5 with a view to finding out another method of preventing the interference of the brake controlling operation transmission member such as the brake hose with the link mechanism 5.

In case the portion of the brake controlling operation transmission member that is located between the positions fixed to the two points (for example, one point on the body frame 21 and one point on the right side portion 54) that are displaced largely relative to each other as the link mechanism 5 operates is defined as the leaning associated deforming portion S, the leaning associated deforming portion S deforms when the relative positions of these two points in the up-and-down direction change largely. Since the link mechanism 5 changes its shape or posture about the axes that extend in the front-and-rear direction, the leaning associated deforming portion S deforms largely in the up-and-down direction but does not deform largely in the directions other than the up-and-down direction (for example, the front-and-rear direction or the left-and-right direction). For example, in the event that the brake controlling operation transmission member is caused to deform along a plane that is perpendicular or substantially perpendicular to the front-and-rear direction or a plane that is perpendicular or substantially perpendicular to the left-and-right direction when the distance between the two points is reduced in the up-to-direction to allow the two points to approach each other, the change in posture of the leaning associated deforming portions is small in the front-and-rear direction or the left-and-right direction.

The wheel turning associated deforming portion T is a portion of the brake controlling operation transmission member that is located between the portion that are fixed to the two points (for example, one point on the upper cross portion 51 and one point on the right brake caliper 42) that are displaced largely relative to each other as the right front wheel 32 and the left front wheel 31 are turned. Since the right front wheel 32 turns about the right steering axis Y2 and the left front wheel 31 turns about the left steering axis Y1, the portion of the brake controlling operation transmission member which deforms when the relative positions of the two points change largely in the front-and-rear or left-and-right direction defines the wheel turning associated deforming portion T. Because of this, the wheel turning associated deforming portion T has to change its shape or posture largely in the front-and-rear or left-and-right direction but does not have to change largely in the up-and-down direction. For example, in the event that the brake controlling operation transmission member is caused to deform along a plane that is perpendicular or substantially perpendicular to the up-and-down direction when the distance between the two points in the left-and-right direction or the front-and-rear direction is reduced to allow the two points to approach each other, the change in posture of the wheel turning associated deforming portion T is small in the up-and-down direction.

In particular, the inventor discovered that by separating the leaning associated deforming portion S from the wheel turning associated deforming portion T, the leaning associated deforming portions is deformed in a small amount in the directions other than the up-and-down direction, and the wheel turning associated deforming portion T is deformed in a small amount in the up-and-down direction.

In addition, the inventor considered the relative displacement between the brake controller 10 such as the master cylinder 12 that is located above the link mechanism 5 and the upper portion (the upper portion of the upper cross portion 51, the upper portion of the right side portion 54, the upper portion of the left side portion 53) of the link mechanism 5 which occurs in association with the operation of the link mechanism 5.

The link mechanism 5 includes the right side portion 54, the left side portion 53, the upper cross portion 51, and the lower cross portion 52.

The right side portion 54 supports an upper portion of the right shock absorber 34 so as to turn about a right steering axis Y2 that extends in the up-and-down direction of the body frame 21.

The left side portion 53 supports an upper portion of the left shock absorber 33 so as to turn a left steering axis Y1 that is parallel to the right steering axis Y2.

The upper cross portion 51 supports the upper portion of the right side portion 54 at the right end portion thereof so as to turn about the upper right axis E that extends in the front-and-rear direction of the body frame 21 and supports the upper portion of the left side portion 53 at the left end portion thereof so as to turn about the upper left axis D that is parallel to the upper right axis E and is supported on the body frame 21 at the middle portion thereof so as to turn about the upper middle axis C that is parallel to the upper right axis E and the upper left axis D.

The lower cross portion 52 supports the lower portion of the right side portion 54 at the right end portion thereof so as to allow it to turn about the lower right axis H that is parallel to the upper right axis E and supports the lower portion of the left side portion 53 at the left end portion thereof so as to allow it to turn about the lower left axis G that is parallel to the upper left axis D and is supported on the body frame 21 at the middle portion thereof so as to turn about the lower middle axis F that is parallel to the upper middle axis C.

The upper cross portion 51 turns relative to the body frame 21 and the body portion about the upper middle axis C that extends in the front-and-rear direction. Because of this, when the link mechanism 5 is activated to operate, the brake controller 10 and the upper portion of the link mechanism 5 are displaced largely relative to each other in the up-and-down direction but are not displaced largely relative to each other in the front-and-rear direction.

In addition, arc-shaped loci along which the right end portion and the left end portion of the upper portion of the link mechanism 5 pass when the link mechanism 5 is activated to operate are such that a dimension in the up-and-down direction is greater than a dimension in the left-and-right direction. Because of this, when the link mechanism 5 is activated to operate, the brake controller 10 and the upper portion of the link mechanism 5 are displaced largely relative to each other in the up-and-down direction but are not displaced largely relative to each other in the left-and-right direction.

The right member (the right front wheel 32, the right shock absorbing device 34, and the right brake device 42) turns about the right steering axis Y2 that extends in the up-and-down direction. Because of this, the right member moves largely relative to the link mechanism 5 in the front-and-rear or left-and-right direction but does not move largely relative to the link mechanism 5 in the up-and-down direction.

The left member (the left front wheel 31, the left shock absorbing device 33, and the left brake device 41) turns about the left steering axis Y1 that extends in the up-and-down direction. Because of this, the left member moves largely relative to the link mechanism 5 in the front-and-rear or left-and-right direction but does not move largely relative to the link mechanism 5 in the up-and-down direction.

Then, the inventor discovered the idea that the restrictors 80 that prevent the movement of the brake controlling operation transmission member are provided at the upper portion of at least one of the upper cross portion 51, the right side portion 54, and the left side portion 53 of the link mechanism 5, the leaning associated deforming portions S are provided between the brake controller 10 and the restrictors 80 and at least the portions of the wheel turning associated deforming portions T are provided between the restrictors 80 and the brake devices 41, 42.

As has been described above, when the body frame 21 leans, both the leaning associated deforming portions S and the link mechanism 5 are displaced largely in the up-and-down direction. In particular, since both the leaning associated deforming portions S and the link mechanism 5 tend to change their shapes or postures in similar directions, even in the event that they are disposed near each other, it is easy to prevent the interference of the leaning associated deforming portions S with the link mechanism 5. Additionally, since both the leaning associated deforming portions S and the link mechanism 5 are displaced largely in the up-and-down direction, it is possible to provide the leaning associated deforming portions S by using the space that is provided to permit the operation of the link mechanism 5. In other words, even though the leaning associated deforming portions S are provided, the expansion of the space that permits the operation of the link mechanism 5 is prevented.

In the manner described above, when the front wheels 3 are turned, both the wheel turning associated deforming portions T and the right member or the left member are displaced largely in the front-and-rear direction or the left-and-right direction relative to the link mechanism 5 but are not displaced largely in the up-and-down direction. In particular, since both the wheel turning associated deforming portions T and the right member or the left member tend to change their shapes or postures in similar directions, even in the event that they are disposed near to each other, it is easy to prevent the interference of the wheel turning associated deforming portions T with the right member or the left member. That the link mechanism and the leaning associated deforming portion tend to change their postures in the similar directions means that the directions in which the link mechanism and the leaning associated deforming portion change their postures largely and the directions in which they change their postures by a small or minimal amount are similar and that the timings at which the link mechanism and the leaning associated deforming portion change their postures are similar. It is possible to provide the wheel turning associated deforming portions T by using the space provided to permit the displacement of the wheel turning associated deforming portions T, the right member or the left member. In other words, even though the wheel turning associated deforming portions T are provided, the expansion of the space that permits the displacement of the right member or the left member is prevented.

Because of this, the leaning associated deforming portions S and the wheel turning associated portions T use the space that permits the displacement of the link mechanism 5 and the space that permits the displacement of the right member or the left member, so that the vehicle 1 is small in size while securing the space where to accommodate the brake controlling operation transmission member. This provides a vehicle 1 including the two front wheels and the body frame 21 that leans that prevents the enlargement in size of the front portion of the vehicle 1 while ensuring the degree of freedom in designing the suspension devices and the front wheels 3.

In addition, in the vehicle 1 according to this preferred embodiment, the brake devices 41, 42 include the right brake device 42 that applies a braking force to the right front wheel 32 and the left brake device 41 that applies a braking force to the left front wheel 31. The restrictors 80 include the right restrictor 80 that is provided at the right portion of the vehicle 1 in relation to the left-and-right direction of the body frame 21 and the left restrictor 80 that is provided at the left portion of the vehicle 1 in relation to the left-and-right direction of the body frame 21. The wheel turning associated deforming portions T include the right wheel turning associated deforming portion T at least a portion of which is located between the right restrictor 80 and the right brake device 42 to deform in response to the turning of the right front wheel 32 about the right steering axis Y2 and the left wheel turning associated deforming portion T at least a portion of which is located between the left restrictor 80 and the left brake device 41 to deform in response to the turning of the left front wheel 31 about the left steering axis Y1.

The right front wheel 32 is turned about the right steering axis Y2, and the left front wheel 31 is turned about the left steering axis Y1. In particular, the right front wheel 32 and the left front wheel 31 are turned about the different axes. Because of this, the right wheel turning associated deforming portion T and the left wheel turning associated deforming portion T are provided separately in the spaces that are separated in the left-and-right direction, so that it is easy to make both the right wheel turning associated deforming portion T and the left wheel turning associated deforming portion T smaller.

In addition, in the vehicle 1 according to this preferred embodiment, the right wheel turning associated deforming portion T extends in the up-and-down direction of the body frame 21 to deform about the right steering axis Y2, and the left wheel turning associated deforming portion T extends in the up-and-down direction of the body frame 21 to deform about the left steering axis Y1.

The right member including the right front wheel 32 changes its shape or posture about the right steering axis Y2 and the right wheel turning associated deforming portion T deforms about the right steering axis Y2 and therefore, the right member and the right wheel turning associated deforming portion T tend to change their shapes or postures in similar directions, and hence, even in the event that the right member and the right wheel turning associated deforming portion T are disposed near to each other, they are prevented from interfering with each other. Because of this, the right wheel turning associated deforming portion T is provided in the space that is provided to permit the displacement of the right member, so that further enlargement of the space that permits the displacement of the right member is prevented.

The left member including the left front wheel 31 changes its shape or posture about the left steering axis Y1 and the left wheel turning associated deforming portion T deforms about the left steering axis Y1, and therefore, the left member and the left wheel turning associated deforming portion T tend to change their shapes or postures in similar directions. Hence, even in the event that the left member and the left wheel turning associated deforming portion T are disposed near each other, they are prevented from interfering with each other. Because of this, the left wheel turning associated deforming portion T is provided in the space that is provided to permit the displacement of the left member, so that further enlargement of the space that permits the displacement of the left member is prevented.

Because of this, the right wheel turning associated deforming portion T and the left wheel turning associated deforming portion T deform about the corresponding steering axes, so that it is easy to make both the right wheel turning associated deforming portion T and the left wheel turning associated deforming portion T smaller.

In the vehicle 1 according to this preferred embodiment, at least the portions of the wheel turning associated deforming portions T are located below the lower cross portion 52.

When the right front wheel 32 and the left front wheel 31 are turned, although the upper cross portion 51, the lower cross portion 52, the right side portion 54, and the left side portion 53 are not displaced relative to the body frame 21, the right front wheel 32, and the left front wheel 31 that are located below the lower cross portion 52 are displaced relative to the body frame 21.

Then, in the event that at least the portions of the wheel turning associated deforming portions T are located below the lower cross portion 52, when the right front wheel 32 and the left front wheel 31 are turned, the wheel turning associated deforming portions T are prevented from interfering with the upper cross portion 51, the lower cross portion 52, the right side portion 54, and the left side portion 53. Because of this, the wheel turning associated deforming portions T are provided in the spaces that are provided to permit the displacement of the right front wheel 32 and the left front wheel 31, so that the enlargement of the spaces that permit the displacement of the right front wheel 32 and the left front wheel 31 is prevented.

Additionally, in the vehicle 1 according to this preferred embodiment, at least the portions of the leaning associated deforming portions S are located between the front or rear of anyone of the upper cross portion 51, the lower cross portion 52, the right side portion 54, and the left side portion 53 and the body cover 22 in relation to the front-and-rear direction of the body frame 21.

When the link mechanism 5 is activated to operate, the upper cross portion 51, the lower cross portion 52, the right side portion 54, and the left side portion 53 turn about the axes that extend individually in the front-and-rear direction. Because of this, even in the event that the link mechanism 5 is activated to operate, the upper cross portion 51, the lower cross portion 52, the right side portion 54, and the left side portion 53 are not displaced largely in the front-and-rear direction. Then, in the event that at least the portions of the leaning associated deforming portions S that deform as the link mechanism 5 operates are located between the front or rear of any one of the upper cross portion 51, the lower cross portion 52, the right side portion 54, and the left side portion 53 and the body cover 22, the leaning associated deforming portions S are prevented from interfering with them. Because of this, the leaning associated deforming portions S are provided in the space that is provided to permit the operation of the link mechanism 5, so that the enlargement of the space that permits the operation of the link mechanism 5 is prevented.

Figure 15:
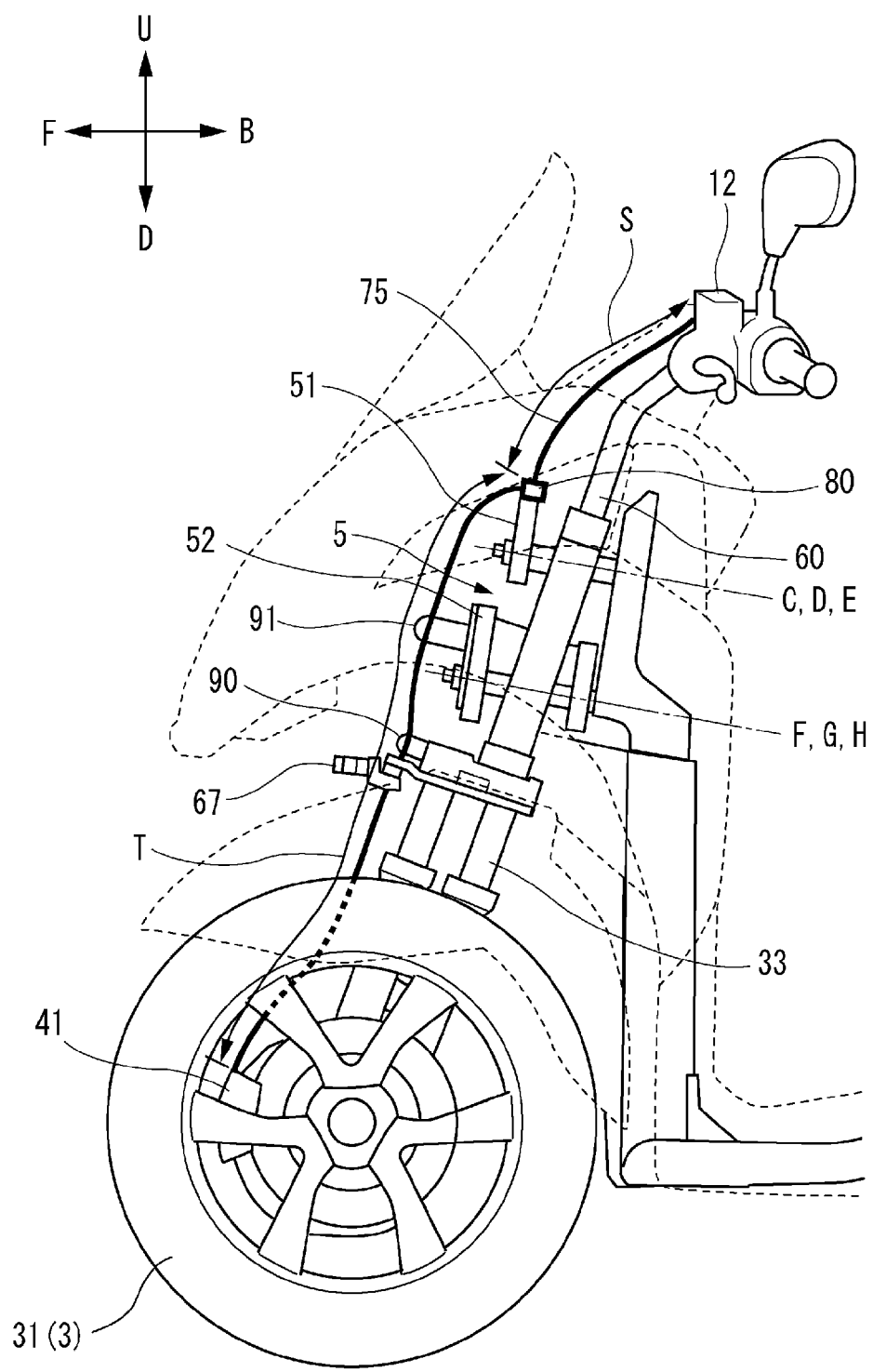
FIG. 15 is a side view of a vehicle according to a modified example of a preferred embodiment of the present invention.

In the preferred embodiments described above, while the right brake hose 76 and the left brake hose 75 preferably pass to the rear of the link mechanism 5, the present invention is not limited thereto. For example, as shown in FIG. 15, the right brake hose 76 and the left brake hose 75 may pass to the front of the link mechanism 5. As this occurs, the guide portions 90 are provided at the front of the front telescopic element of the left shock absorber 33 and at the front of the front telescopic element of the right shock absorber 34.

Even in the event that the vehicle is caused to lean or the front wheels 3 are turned, the space between the front cover 221 and the link mechanism 5 only changes a little. Because of this, even in the event that the wheel turning associated deforming portions T are provided at the front of the link mechanism 5, the wheel turning associated deforming portions T are prevented from interfering with the other members, and the enlargement of the front portion of the vehicle is prevented by designing the front cover 221 to reduce this space.

Thus, while the present invention has been described heretofore by the use of the preferred embodiments thereof, the technical scope of the present invention is not limited to the technical scope that is descriptively defined in the preferred embodiments. It is apparent to those skilled in the art to which the present invention pertains that various alterations or improvements can be made to the preferred embodiments.

The preferred embodiments that have been described heretofore are intended to facilitate the understanding of the present invention and is not intended to limit the present invention. It is apparent that the preferred embodiments of the present invention can be modified or improved without departing from the spirit and scope thereof and that their equivalents can also be included in the present invention.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

In addition, in the preferred embodiments described above, while the brake hose that transmits the brake fluid from the master cylinder 12 to the brake calipers is preferably an example of the brake controlling operation transmission member, the present invention is not limited thereto. For example, the brake controlling operation transmission member may be an electric wire that transmits a control signal that signals an activation of the brake device that applies a braking force to the front wheels 3 from the brake controller 10 to the brake device. Alternatively, the brake controlling operation transmission member may be a metallic tube of which a brake fluid is filled in an interior, or a metallic cable that connects the master cylinder 12 to the brake calipers. In addition, as the brake controlling operation transmission member, the brake hose may be combined with one or more of the electric wire, the metallic tube, the metallic cable and the like to connect the master cylinder 12 to the brake calipers.

Additionally, in the preferred embodiments and modified examples described above, while the portion of the brake controlling operation transmission member is preferably laid out to pass directly behind or directly ahead of the link mechanism 5, the present invention is not limited thereto. The portion of the brake controlling operation transmission member may be laid out to pass directly on the right of the link mechanism 5 and/or directly on the left of the link mechanism 5.

A metallic fastener or a ribbon that is fixed to the body frame 21 or the like to prevent the movement of the brake hose or a sleeve or rubber bush of which the brake hose is inserted through an interior may be used as the restrictor 80.

It is noted that the restrictor 80 is not limited to those described above and hence should be any member as long as it prevents the movement of the brake hose.

Additionally, in the preferred embodiments described above, while the left brake caliper 41 and the right brake caliper 42 are preferably controlled by the master cylinder 12 that is provided at the right portion of the handlebar 23, the present invention is not limited thereto. A configuration may be used in which either of the left brake caliper 41 and the right brake caliper 42 is controlled by, for example, the master cylinder 12 that is provided at the right portion of the handlebar 23 and that is positioned above the link mechanism, while the other of the left brake caliper 41 and the right brake caliper 42 is controlled by a foot brake that is not positioned above the link mechanism.

In the preferred embodiments described above, the acute angles are angles that include 0° and that are smaller than 90°. Normally, the acute angles do not include 0°, but in the preferred embodiments, of the present invention it is understood that the acute angles include 0°. In the preferred embodiments described above, the imaginary plane that intersects perpendicularly or substantially perpendicularly to the upper axes and the lower axes of the cross members is a plane that extends rearward and upward. However, the present invention is not limited thereto, and hence, the imaginary plane that intersects perpendicularly or substantially perpendicularly the upper axes and the lower axes of the cross members may be a plane that extends forward and upward.

When referred to in this description, "parallel" also includes two straight lines that do not intersect each other as members while they are inclined within the range of ±40°. When used together with a "direction" and a "member" in the present invention, "along" also includes a case where what follows the direction and the member is inclined relative thereto within the range of ±40°. When used together with a "direction" in the present invention, "extend" also includes a case where what extends is inclined relative to the direction within the range of ±40°.

The vehicle 1 according to the preferred embodiments described above preferably is a vehicle 1 including the body frame which leans and the two front wheels. The number of rear wheels may be one or more. The vehicle may include a body cover that covers the body frame. The vehicle may not include the body cover which covers the body frame. The power unit includes the power source. The power source is not limited to the engine and hence may be an electric motor.

In the preferred embodiments described above, the center in the left-and-right direction of the body frame 21 of the rear wheel 4 preferably coincides with the center in the left-and-right direction of the body frame 21 of the distance defined between the left front wheel 31 and the right front wheel 32. Although the configuration described above is preferable, the center in the left-and-right direction of the body frame 21 of the rear wheel 4 does not have to coincide with the center in the left-and-right direction of the body frame 21 of the distance defined between the left front wheel 31 and the right front wheel 32.

In the preferred embodiments described above, when viewing the body frame 21 from a side thereof, the right side portion 54, the left side portion 53, and the headstock 211 (the link support portion) are preferably provided in positions where they overlap one another. However, when the body frame 21 is viewed from the side thereof, the headstock 211 may be provided in a different position from the positions where the right side portion 53 and the left side portion 54 are provided in relation to the front-and-rear direction. Additionally, angles at which the right side portion 54 and the left side portion 53 lean from the up-and-down direction of the body frame 21 may differ from an angle at which the headstock 211 leans.

The link support portion (the headstock) may include a single structural element or a plurality of structural elements. In the case of the headstock including plurality of structural elements, the structural elements may be joined together through welding, bonding or the like. Alternatively, the structural elements may be joined together with fastening members such as bolts, rivets or the like.

In the preferred embodiments described above, while the headstock 211 is preferably a portion of the body frame 21 that supports the steering shaft 60 so as to turn, the present invention is not limited thereto. A member may be used which supports the steering shaft 60 so as to turn about a middle steering axis Y3 in place of the headstock. For example, a member may be used which includes a bearing which supports the steering shaft 60 so as to turn about the middle steering axis Y3.

In the preferred embodiments described above, the body frame includes the link support portion, the connecting member (the upper front-and-rear frame portion), the down frame (the up-and-down frame portion) and the under frame (the lower front-and-rear frame portion), and these frame elements are connected together through welding. However, the body frame of the present invention is not limited to the preferred embodiments described above. The body frame preferably includes the link support portion, the upper front and rear frame portions, the upper and lower frame portions and the lower front and rear frame portions. For example, the body frame may be integral wholly or partially through casting. Additionally, in the body frame, the upper front and rear frame portions and the upper and lower frame portions may include a single member or may include separate members.

In the preferred embodiment described above, the left shock absorber 33 and the right shock absorber 34 each preferably include the pair of telescopic mechanisms. However, depending upon the specification of the vehicle 1, the number of telescopic mechanisms that the left shock absorber 33 and the right shock absorber 34 include individually may be one.

In the preferred embodiments described above, an acute angle defined by the turning axis of the steering shaft and the up-and-down direction of the body frame coincides with an acute angle defined by the direction in which the right shock absorber and the left shock absorber extend or contract and the up-and-down direction of the body frame. However, the present invention is not limited to the preferred embodiments described above. For example, the acute angle defined by the turning axis of the steering shaft and the up-and-down direction of the body frame may be smaller or greater than the acute angle defined by the direction in which the right shock absorber and the left shock absorber extend and contract and the up-and-down direction of the body frame.

In addition, in the preferred embodiments described above, the turning axis of the steering shaft and the direction in which the right shock absorber and the left shock absorber extend and contact preferably coincide with each other. However, the present invention is not limited to the preferred embodiments described above. In a side view of the vehicle being in the upright state, the turning axis of the steering shaft and the direction in which the right shock absorber and the left shock absorber extend or contact may be spaced apart from each other in the front-and-rear direction. Additionally, for example, the turning axis of the steering shaft and the direction in which the right shock absorber and the left shock absorber extend or contact may intersect each other.

In the preferred embodiments described above, the right front wheel and the left front wheel are preferably supported so that their upper ends move farther upward in the up-and-down direction of the body frame than an upper end of the down frame of the body frame. However, the present invention is not limited to the preferred embodiments described above. In the present invention, the right front wheel and the left front wheel may be able to move upward as high as or to a height that is lower than the upper end of the down frame of the body frame in the up-and-down direction of the body frame.

The upper cross portion may include an upper front cross portion that includes a single portion, an upper rear cross portion that includes a single portion, and a connecting member that is provided between the upper and lower cross portions and that includes a plurality of portions. In the case of the headstock including a plurality of portions, the portions may be joined together through welding, bonding or the like. Alternatively, the portions may be joined together with fastening members such as bolts, rivets or the like.

The lower cross portion may include a lower front cross portion that includes a single portion, a lower rear cross portion that includes a single portion and a connecting member that is provided between the lower front and rear cross portions and that includes a plurality of portions. In the case of the headstock includes a plurality of portions, the portions may be joined together through welding, bonding or the like. Alternatively, the portions may be joined together with fastening members such as bolts, rivets or the like.

The right side portion and the left side portion may each include a single portion or a plurality of portions. In the case of the headstock includes a plurality of portions, the portions may be joined together through welding, bonding or the like. Alternatively, the portions may be joined together with fastening members such as bolts, rivets or the like. The right side portion and the left side portion may each include a portion that is disposed ahead of the upper cross portion or the lower cross portion in the front-and-rear direction of the body frame and a portion that is disposed behind the upper cross portion or the lower cross portion in the front-and-rear direction of the body frame. The upper cross portion or the lower cross portion may be disposed between the portions that are disposed ahead of the right side portion and the left side portion and the portions that are disposed behind the right side portion and the left side portion.

In the preferred embodiments described above, the link mechanism may include further a cross portion in addition to the upper cross portion and the lower cross portion. The upper cross portion and the lower cross portion are so called only from their relative positional relationship in the up-and-down direction. The upper cross portion does not imply an uppermost cross portion in the link mechanism. The upper cross portion means a cross portion that lies above a cross portion that lies therebelow. The lower cross portion does not imply a lowermost cross portion in the link mechanism. The lower cross portion means a cross portion that lies below a cross portion that lies thereabove. Additionally, the cross portion may include two portions of a right cross portion and a left cross portion. In this manner, the upper cross portion and the lower cross portion may each include a plurality of cross portions as long as they still exhibit the link function. Further, other cross portions may be provided between the upper cross portion and the lower cross portion.

The link mechanism should preferably include the upper cross portion and the lower cross portion.

The present invention can be embodied in many different forms. This disclosure should be understood to provide principle preferred embodiments of the present invention. Based on the understanding that the preferred embodiments that are described and/or illustrated herein are not intended to limit the present invention thereto, several preferred embodiments are described and illustrated herein.

Several illustrated preferred embodiments of the present invention are described herein. The present invention is not limited to the various preferred embodiments described herein. The present invention also includes every preferred embodiment that includes equivalent elements, modifications, deletions, combinations (for example, a combination of characteristics of various preferred embodiments), improvements and/or alternations that those skilled in the art to which the present invention pertains can recognize based on the disclosure herein. The limitative matters of claims should be construed broadly based on terms used in the claims and hence should not be limited by the preferred embodiments described in this description or the prosecution of this patent application. The preferred embodiments should be construed to be non-exclusive. For example, in this disclosure, such terms as "preferable" and "good" are non-exclusive terms and mean that "it is preferable but does not limit the present invention thereto" and "it is good but does not limit the present invention thereto," respectively.

The contents of the Japanese Patent Application No. 2013-138482 filed on Jul. 1, 2013 are incorporated herein by reference in their entirety and constitute part of the description of this patent application. In particular, configurations which will be itemized below also constitute part of the description of this patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a body frame that leans to the right of the vehicle when the vehicle turns right and that leans to the left of the vehicle when the vehicle turns left;
a right front wheel and a left front wheel that are aligned in a left-and-right direction of the body frame;
a right suspension device that supports the right front wheel at a lower portion thereof to absorb an upward displacement of the right front wheel in an up-and-down direction of the body frame;
a left suspension device that supports the left front wheel at a lower portion thereof to absorb an upward displacement of the left front wheel in the up-and-down direction of the body frame;
a link mechanism including:
a right side portion that supports an upper portion of the right suspension device so as to allow the upper portion to turn about a right steering axis that extends in the up-and-down direction of the body frame;
a left side portion that supports an upper portion of the left suspension device so as to allow the upper portion to turn about a left steering axis that is parallel to the right steering axis;
an upper cross portion that supports, at a right end portion thereof, an upper portion of the right side portion so as to allow the upper portion to turn about an upper right axis that extends in a front-and-rear direction of the body frame and supports, at a left end portion thereof, an upper portion of the left side portion so as to allow the upper portion to turn about an upper left axis that is parallel or substantially parallel to the upper right axis, and that is supported on the body frame at a middle portion thereof so as to turn about an upper middle axis that is parallel or substantially parallel to the upper right axis and the upper left axis; and a lower cross portion that supports, at a right end portion thereof, a lower portion of the right side portion so as to allow the lower portion to turn about a lower right axis that is parallel or substantially parallel to the upper right axis and supports, at a left end portion thereof, a lower portion of the left side portion so as to allow the lower portion to turn about a lower left axis that is parallel or substantially parallel to the upper left axis, and that is supported on the body frame at a middle portion so as to turn about a lower middle axis that is parallel or substantially parallel to the upper middle axis and the lower middle axis;

a body cover that covers at least a portion of the link mechanism;

a steering shaft that is supported on the body frame between the right suspension device and the left suspension device in the left-and-right direction of the body frame that turns about a middle steering axis that extends in the up-and-down direction of the body frame;

a handlebar that is provided at an upper end portion of the steering shaft;

a wheel turning operation transmission mechanism that turns the right suspension device about the right steering axis and the left suspension device about the left steering axis as the steering shaft turns in response to the operation of the handlebar;

a brake device that is provided below the link mechanism to apply a braking force to at least one of the right front wheel and the left front wheel;

a brake controller that is provided above the link mechanism to control the brake device; and a brake controlling operation transmission member that connects the brake controller and the brake device together so as to transmit a brake controlling operation that is inputted into the brake controller to the brake device; wherein a restrictor that prevents a movement of the brake controlling operation transmission member is provided at an upper portion of at least one of the upper cross portion, the right side portion, and the left side portion; and the brake controlling operation transmission member includes a leaning associated deforming portion that is located between the brake controller and the restrictor to deform in response to the leaning of the body frame and a wheel turning associated deforming portion that is located between the leaning associated deforming portion and the brake device to deform in response to the turning of the right front wheel and the left front wheel.

2. The vehicle according to claim 1, wherein the brake device includes a right brake device that applies a braking force to the right front wheel and a left brake device that applies a braking force to the left front wheel;

the restrictor includes a right restrictor that is provided at a right portion of the vehicle in relation to the left-and-right direction of the body frame and a left restrictor that is provided at a left portion of the vehicle in relation to the left-and-right direction of the body frame; and the wheel turning associated deforming portion includes a right wheel turning associated deforming portion at least a portion of which is located between the right restrictor and the right brake device and which deforms as the right front wheel is turned about the right steering axis, and a left wheel turning associated deforming portion at least a portion of which is located between the left restrictor and the left brake device and that deforms as the left front wheel is turned about the left steering axis.

3. The vehicle according to claim 2, wherein the right wheel turning associated deforming portion extends in the up-and-down direction of the body frame to deform about the right steering axis; and the left wheel turning associated deforming portion extends in the up-and-down direction of the body frame to deform about the left steering axis.

4. The vehicle according to claim 1, wherein at least a portion of the wheel turning associated deforming portion is located below the lower cross portion.

5. The vehicle according to claim 1, wherein at least a portion of the leaning associated deforming portion is located between the front or rear of any one of the upper cross portion, the lower cross portion, the right side portion, and the left side portion and the body cover in relation to the front-and-rear direction of the body frame.

* * * * *